US011826847B2

(12) United States Patent
Ames et al.

(10) Patent No.: US 11,826,847 B2
(45) Date of Patent: Nov. 28, 2023

(54) CONTROLLING PLASMA ARC TORCHES AND RELATED SYSTEMS AND METHODS

(71) Applicant: Hypertherm, Inc., Hanover, NH (US)

(72) Inventors: Jonathan Ames, Grantham, NH (US); Christopher S. Passage, Canaan, NH (US); Soumya Mitra, Lebanon, NH (US); John Peters, Canaan, NH (US)

(73) Assignee: Hypertherm, Inc., Hanover, NH (US)

( * ) Notice: Subject to any disclaimer, the term of this patent is extended or adjusted under 35 U.S.C. 154(b) by 0 days.

(21) Appl. No.: 16/737,574

(22) Filed: Jan. 8, 2020

(65) Prior Publication Data

US 2020/0139479 A1 May 7, 2020

Related U.S. Application Data

(63) Continuation of application No. 15/287,694, filed on Oct. 6, 2016, now Pat. No. 10,562,125.

(Continued)

(51) Int. Cl.
*B23K 10/00* (2006.01)
*H05H 1/34* (2006.01)
*H05H 1/36* (2006.01)

(52) U.S. Cl.
CPC ............ *B23K 10/006* (2013.01); *B23K 10/00* (2013.01); *H05H 1/34* (2013.01); *H05H 1/36* (2013.01);

(Continued)

(58) Field of Classification Search
CPC ........ B23K 10/006; B23K 10/00; H05H 1/34; H05H 1/36; H05H 1/3494; H05H 1/3421; H05H 1/3473

(Continued)

(56) References Cited

U.S. PATENT DOCUMENTS

| 4,017,707 A | 4/1977 | Brown et al. |
| 4,163,891 A | 8/1979 | Komatsu et al. |

(Continued)

FOREIGN PATENT DOCUMENTS

| CN | 1506186 A | 6/2004 |
| CN | 1507973 A | 6/2004 |

(Continued)

OTHER PUBLICATIONS

"Controlling Plasma Arc Torches and Related Systems and Methods", Specification, Drawings, and Prosecution History of U.S. Appl. No. 15/287,696, filed Oct. 6, 2016, by Liebold et al. which is stored in the United States Patent and Trademark Office Patent Application Information Retrieval System.

(Continued)

*Primary Examiner* — Jimmy Chou
(74) *Attorney, Agent, or Firm* — Cesari & McKenna, LLC

(57) ABSTRACT

In some aspects, methods for preserving a usable life of a plasma arc electrode consumable installed in a plasma arc torch can include measuring a characteristic of an electrical signal being provided to the torch to generate a plasma arc between the torch and a workpiece to be processed; monitoring the characteristic during operation of the torch over a time period; comparing the characteristic to a threshold value; and, responsive to determining that a measured characteristic meets and/or exceeds the threshold value, initiating an arc extinguishing sequence to preserve the life of the electrode.

10 Claims, 12 Drawing Sheets

Related U.S. Application Data

(60) Provisional application No. 62/237,780, filed on Oct. 6, 2015.

(52) U.S. Cl.
CPC ......... *H05H 1/3421* (2021.05); *H05H 1/3473* (2021.05); *H05H 1/3494* (2021.05)

(58) Field of Classification Search
USPC ............ 219/121.39, 121.44, 121.55, 121.57, 219/121.36
See application file for complete search history.

(56) References Cited

U.S. PATENT DOCUMENTS

| | | | |
|---|---|---|---|
| 4,410,788 A | 10/1983 | Summers et al. | |
| 4,766,287 A | 8/1988 | Morrisroe et al. | |
| 4,861,962 A | 8/1989 | Sanders et al. | |
| 4,977,305 A | 12/1990 | Severance, Jr. | |
| 5,036,176 A | 7/1991 | Yamaguchi et al. | |
| 5,070,227 A | 12/1991 | Luo et al. | |
| 5,166,494 A * | 11/1992 | Luo ...................... | B23K 10/006 219/121.57 |
| 5,170,030 A | 12/1992 | Solley et al. | |
| 5,189,277 A | 2/1993 | Boisvert et al. | |
| 5,317,126 A | 5/1994 | Couch, Jr. et al. | |
| 5,326,955 A * | 7/1994 | Nishi .................... | B23K 9/126 219/121.56 |
| 5,380,976 A | 1/1995 | Couch, Jr. et al. | |
| 5,396,043 A * | 3/1995 | Couch, Jr. .......... | B23K 10/006 219/121.48 |
| 5,414,237 A * | 5/1995 | Carkhuff ................ | H05H 1/34 219/121.48 |
| 5,416,297 A | 5/1995 | Luo et al. | |
| 5,424,507 A * | 6/1995 | Yamaguchi .......... | B23K 10/006 219/121.57 |
| 5,506,384 A * | 4/1996 | Yamaguchi .......... | B23K 10/006 219/121.54 |
| 5,530,220 A | 6/1996 | Tatham | |
| 5,591,357 A | 1/1997 | Couch, Jr. et al. | |
| 5,614,110 A * | 3/1997 | Shintani ............... | B23K 10/006 219/121.44 |
| 5,620,617 A | 4/1997 | Borowy et al. | |
| 5,695,662 A | 12/1997 | Couch, Jr. et al. | |
| 5,756,963 A | 5/1998 | Higgins et al. | |
| 5,801,355 A | 9/1998 | Saio et al. | |
| 5,900,169 A | 5/1999 | Borowy et al. | |
| 5,960,026 A | 9/1999 | Nolting et al. | |
| 6,051,804 A | 4/2000 | Reynolds et al. | |
| 6,091,049 A | 7/2000 | Ikeda et al. | |
| 6,163,009 A * | 12/2000 | Hardwick ................ | H05H 1/26 219/121.57 |
| 6,326,583 B1 | 12/2001 | Hardwick et al. | |
| 6,350,960 B1 | 2/2002 | Norris | |
| 6,359,251 B1 | 3/2002 | Picard et al. | |
| 6,365,868 B1 | 4/2002 | Borowy et al. | |
| 6,369,350 B1 * | 4/2002 | Norris .................... | H05H 1/36 219/121.57 |
| 6,498,317 B2 | 12/2002 | Hardwick | |
| 6,622,058 B1 | 9/2003 | Picard et al. | |
| 6,677,551 B2 | 1/2004 | Hardwick | |
| 6,717,096 B2 | 4/2004 | Hewett et al. | |
| 6,903,301 B2 | 6/2005 | Jones et al. | |
| 7,015,412 B1 * | 3/2006 | Uttrachi ................ | B23K 35/38 219/74 |
| 7,071,441 B1 | 7/2006 | Bulle | |
| 8,168,916 B2 | 5/2012 | Hussary et al. | |
| 8,541,710 B2 | 9/2013 | Brandt et al. | |
| 8,809,728 B2 | 8/2014 | Brandt et al. | |
| 9,148,053 B2 | 9/2015 | Kamath et al. | |
| 9,321,120 B2 | 4/2016 | Wood et al. | |
| 9,427,820 B2 | 8/2016 | Mather et al. | |
| 9,481,050 B2 | 11/2016 | Brine et al. | |
| 10,039,178 B2 * | 7/2018 | Liu ...................... | B23K 10/006 |
| 10,562,125 B2 * | 2/2020 | Ames .................... | B23K 10/006 |
| 2001/0045415 A1 * | 11/2001 | Hardwick ............ | B23K 10/00 219/121.51 |
| 2002/0117484 A1 | 8/2002 | Jones et al. | |
| 2003/0204283 A1 * | 10/2003 | Picard .................... | B23K 10/00 700/166 |
| 2004/0045942 A1 | 3/2004 | Norris et al. | |
| 2004/0129687 A1 | 7/2004 | Yamaguchi et al. | |
| 2005/0035093 A1 * | 2/2005 | Yamaguchi ............ | B23K 10/00 219/121.39 |
| 2005/0077273 A1 * | 4/2005 | Matus .................. | B23K 10/006 219/121.54 |
| 2005/0284849 A1 | 12/2005 | Eldridge | |
| 2006/0091118 A1 | 5/2006 | Eldridge | |
| 2006/0163216 A1 * | 7/2006 | Brandt .................... | H05H 1/36 219/121.39 |
| 2006/0163220 A1 * | 7/2006 | Brandt .................... | H05H 1/36 219/121.55 |
| 2006/0226130 A1 | 10/2006 | Kooken et al. | |
| 2008/0006614 A1 | 1/2008 | Brandt et al. | |
| 2008/0066596 A1 * | 3/2008 | Yamaguchi .......... | B23K 26/702 83/34 |
| 2008/0083714 A1 * | 4/2008 | Kamath .................. | H05H 1/36 219/121.57 |
| 2008/0084721 A1 | 4/2008 | Miramonti et al. | |
| 2008/0169272 A1 | 7/2008 | Brandt et al. | |
| 2008/0210670 A1 | 9/2008 | Brandt et al. | |
| 2008/0302767 A1 * | 12/2008 | Yamaguchi ............ | B23K 10/00 219/121.55 |
| 2009/0084768 A1 * | 4/2009 | Ohashi ................ | B23K 10/006 219/130.4 |
| 2009/0230098 A1 | 9/2009 | Salsich et al. | |
| 2009/0312862 A1 * | 12/2009 | Fagan .................. | B23K 10/006 700/160 |
| 2010/0018954 A1 | 1/2010 | Hussary et al. | |
| 2010/0314362 A1 * | 12/2010 | Albrecht .............. | B23K 26/348 219/121.63 |
| 2012/0052599 A1 | 3/2012 | Brouk et al. | |
| 2012/0138583 A1 | 6/2012 | Winn et al. | |
| 2012/0234803 A1 * | 9/2012 | Liu ...................... | B23K 10/006 219/121.54 |
| 2013/0043224 A1 | 2/2013 | Leiteritz et al. | |
| 2013/0319978 A1 | 12/2013 | Wood et al. | |
| 2014/0110380 A1 * | 4/2014 | Kamath .................. | B23K 10/00 219/121.39 |
| 2014/0110381 A1 * | 4/2014 | Mather .................. | B23K 10/00 219/121.57 |
| 2014/0113527 A1 * | 4/2014 | Lindsay ................ | B23K 26/21 451/5 |
| 2014/0144891 A1 * | 5/2014 | Laurisch .................. | H05H 1/34 219/121.44 |
| 2014/0238861 A1 * | 8/2014 | Foret .................... | E21B 21/063 204/660 |
| 2014/0353294 A1 | 12/2014 | Yamaguchi et al. | |
| 2015/0021302 A1 * | 1/2015 | Zhang .................... | H05H 1/34 219/121.52 |
| 2015/0027998 A1 * | 1/2015 | Brine .................... | B23K 10/006 219/121.44 |
| 2015/0060426 A1 | 3/2015 | Shartner et al. | |
| 2015/0127137 A1 * | 5/2015 | Brandt .................... | B26F 3/004 700/166 |
| 2015/0129563 A1 * | 5/2015 | Hodges .................. | B23K 10/00 219/121.44 |
| 2015/0231724 A1 | 8/2015 | Williams | |
| 2015/0342019 A1 * | 11/2015 | Peters .................. | H05H 1/3405 219/121.51 |
| 2016/0023295 A1 | 1/2016 | Lambert et al. | |
| 2016/0067812 A1 | 3/2016 | Higgins et al. | |
| 2017/0014932 A1 | 1/2017 | Henry | |
| 2017/0095877 A1 * | 4/2017 | Ames .................... | B23K 10/00 |
| 2017/0095878 A1 | 4/2017 | Liebold et al. | |
| 2017/0095879 A1 | 4/2017 | Mitra et al. | |

(56) References Cited

U.S. PATENT DOCUMENTS

2020/0296818 A1* 9/2020 Camy-Peyret ......... B23K 10/00
2021/0138574 A1* 5/2021 Williams ................. H05H 1/28

FOREIGN PATENT DOCUMENTS

| CN | 203556993 U | * | 4/2014 | ........... B23K 10/006 |
| WO | 99/04924 | | 2/1999 | |
| WO | 2008/033901 | | 3/2008 | |
| WO | WO-2008/033601 A2 | | 3/2008 | |
| WO | 2012/009634 | | 1/2012 | |
| WO | 2015128719 A1 | | 9/2015 | |

OTHER PUBLICATIONS

"Controlling Plasma Arc Torches and Related Systems and Methods", Specification, Drawings, and Prosecution History of U.S. Appl. No. 15/287,698, filed Oct. 6, 2016, by Mitra et al. which is stored in the United States Patent and Trademark Office Patent Application Information Retrieval System.

* cited by examiner

CONTROLLING PLASMA ARC TORCHES AND RELATED SYSTEMS AND METHODS

RELATED APPLICATIONS

This application is a continuation of U.S. Non-Provisional patent application Ser. No. 15/287,694 filed Oct. 6, 2016, entitled "Controlling Plasma Arc Torches and Related Systems and Methods," which claims the benefit of U.S. Provisional Patent Application Ser. No. 62/237,780 filed Oct. 6, 2015, entitled "Controlling Plasma Arc Torches and Related Systems and Methods," the contents of which are hereby incorporated herein by reference in their entirety.

TECHNICAL FIELD

This disclosure relates generally to thermal cutting torches (e.g., plasma arc torches), and more specifically to controlling plasma arc torches and related systems and methods.

BACKGROUND

Thermal processing torches, such as plasma arc torches, are widely used in the heating, cutting, gouging, and marking of materials. A plasma arc torch generally includes an electrode, a nozzle having a central exit orifice mounted within a torch body, electrical connections, passages for cooling, and passages for arc control fluids (e.g., plasma gas). A swirl ring can be used to control fluid flow patterns in the plasma chamber formed between the electrode and the nozzle. In some torches, a retaining cap can be used to maintain the nozzle and/or swirl ring in the torch body. In operation, a plasma arc torch produces a plasma arc, which is a constricted jet of an ionized gas with high temperature and sufficient momentum to assist with removal of molten metal. Power used to operate plasma arc torches can be controlled by a power supply assembly of a plasma operating system. The power supply can include a plurality of electronic components configured to control and supply an operational current to the plasma arc torch, the gas flows provided to the plasma arc torch, and, in some cases, motion of the plasma arc torch.

During a cutting sequence, a plasma jet is used to first pierce through a workpiece to form an initial pilot hole. The pilot hole typically must be formed before the torch can be moved to form the cut. Conventional systems are typically unable to determine how long it actually takes for the plasma jet to fully pierce a workpiece. Therefore, empirical data is used to determine a conservative time estimate in which worn consumables could fully perform the piecing operation. As a result of these conservative time estimates, plasma jets are commonly held in place for more time than needed to pierce the workpiece, which can result in lost processing time, unnecessary electrode wear, and potential workpiece warping or damage.

Some systems are configured to implement certain gas or electrical parameters during start up or shut down based on desired characteristics of the arc during use. For example, some systems, upon intentional extinguishing of the plasma arc, can provide desirable gas flow or current profile combinations for shut down.

Typically, after prolonged use, consumables, such as electrodes, can physically degrade and begin to mechanically break down due to heat and pressure. In some cases, electrodes can undergo catastrophic failure, which can be referred to as a complete blowout in which molten metal portions of the consumable may flow back into the torch clogging passageways, unintended component arcing may occur, and/or the electrode can break apart and be expelled into the torch. Such actions can cause damage to the torch.

SUMMARY

In some aspects, methods, and related systems and means for carrying out the methods, for preserving a usable life of a plasma arc electrode consumable installed in a plasma arc torch, can include measuring a characteristic of an electrical signal being provided to the torch to generate a plasma arc between the torch and a workpiece to be processed; monitoring the characteristic during operation of the torch over a time period; comparing the characteristic to a threshold value; and responsive to determining that a measured characteristic meets and/or exceeds the threshold value, initiating an arc extinguishing sequence to preserve the life of the electrode.

Embodiments can include one or more of the following features.

In some embodiments, the characteristic represents a pulse width modulation duty cycle. In some embodiments, the threshold value is greater than about 80%. In some embodiments, the method further includes comparing the bus voltage to an incoming voltage to determine a duty cycle percentage of at least one of a chopper or a pulse width modulator. In some embodiments, the characteristic comprises a pulse width modulation value. The characteristic can include a rate of change of a pulse width modulation value. In some embodiments, the arc extinguishing sequence comprises causing a decrease in a plenum gas pressure. In some embodiments, the arc extinguishing sequence comprises causing a decrease in arc current. In some embodiments, the arc extinguishing sequence is completed in less than about 70 milliseconds. In some embodiments, the measured characteristic meeting or exceeding the threshold value indicates an increasing distance between the plasma arc torch and an arc attachment point where the plasma arc attaches to the workpiece. In some cases, the increasing distance indicates that the torch has reached at least one of an edge of the workpiece. In some cases, the increasing distance indicates that the torch has reached a kerf area. In some embodiments, the threshold is predefined for a particular cutting process. In some embodiments, the comparing the characteristic comprises referencing a lookup table of threshold values for a particular cutting process.

In some aspects, methods, and related systems and means for carrying out the methods, of operating a plasma arc torch and extinguishing a plasma arc during a material processing operation to limit electrode wear resulting from unintended arc loss can include initiating the plasma arc between an electrode of the plasma arc torch and a workpiece to be processed with the torch; translating the torch along the workpiece and performing a processing operation to the workpiece; advancing the torch towards a void defined by the workpiece; responsive to the torch reaching the void, detecting a lengthening of the plasma arc between the arc attachment point and the torch; and based on the detected plasma arc lengthening, initiating an arc extinguishing sequence to limit wear of the electrode.

Embodiments can include one of more of the following features.

In some embodiments, the void comprises a peripheral edge of the workpiece. In some embodiments, the detecting the lengthening of the plasma arc comprises monitoring a characteristic of an electrical signal being provided to the torch to generate the plasma arc and comparing the characteristic to a threshold value. In some cases, the characteristic comprises measuring a bus voltage. In some cases, the methods further comprise comparing the bus voltage to an incoming voltage to determine a duty cycle percentage of at least one of a chopper or a pulse width modulator. In some embodiments, the characteristic comprises a pulse width modulation value. In some embodiments, the characteristic comprises a rate of change of a pulse width modulation value. In some embodiments, the arc extinguishing sequence comprises causing a decrease in a plenum gas pressure. In some embodiments, the arc extinguishing sequence comprises causing a decrease in arc current. In some embodiments, the arc extinguishing sequence is completed in less than about 70 milliseconds.

In some aspects, plasma arc material processing systems can include a torch including a torch body configured to receive a set of consumable components connected to the torch body and configured to generate a plasma arc; and a power supply operably connected to the torch, the power supply comprising: a means for measuring a characteristic of an electrical signal being provided to the torch to generate the plasma arc between the torch and a workpiece to be processed; a means for monitoring the characteristic during operation of the torch over a time period; a means for comparing the characteristic to a threshold value; and a means for, responsive to determining that a measured characteristic meets and/or exceeds the threshold value, initiating an arc extinguishing sequence to preserve the life of the electrode.

In some aspects, methods, and systems and means for carrying out the methods, for limiting damage to a plasma arc torch body resulting from a consumable failure within the torch can include determining a specified conductivity parameter set point of a current to be provided to the plasma arc torch for a material processing operation; measuring a detected conductivity parameter of plasma arc current being provided to the plasma torch to perform the material processing operation; comparing the specified conductivity parameter set point to the detected conductivity parameter of plasma arc current and calculating an error term signal; and based on a determination that the error term signal exceeds a threshold amount, initiating a plasma arc shut down sequence to extinguish the plasma arc to limit damage to the plasma arc torch body.

Embodiments can include one or more of the following features.

In some embodiments, the specified conductivity parameter set point of a current to be provided to the plasma arc torch comprises a plasma arc current set point. In some embodiments, the specified conductivity parameter set point of a current to be provided to the plasma arc torch comprises a plasma arc voltage set point. In some embodiments, the error term signal comprises a compilation of multiple comparisons of the specified current set point to the detected plasma arc current at multiple times during a material processing operation. In some cases, the multiple times comprise a predetermined time interval. In some cases, the multiple comparisons comprises a rolling sum of multiple error term signals detected over consecutive plasma arc current measurements. In some cases, the multiple error term signals comprises about 5 error term signals to about 20 error term signals. In some embodiments, the method also includes referencing a lookup table of example error term signal threshold amounts. In some cases, the lookup table comprises multiple example error term signal threshold amounts. In some cases, each of the multiple example error term signal threshold amounts correspond to different material processing scenarios. In some embodiments, an increasing error term indicates a physical degradation of the consumable in the plasma torch. In some embodiments, the plasma arc shut down sequence comprises causing a decrease in a plenum gas pressure. In some embodiments, the plasma arc shut down sequence comprises causing a decrease in arc current. In some embodiments, the plasma arc shut down sequence is completed in less than about 70 milliseconds.

In some aspects, methods, and systems the means for carrying out the methods, of operating a plasma arc torch can include initiating a plasma arc in the plasma arc torch and sending a signal to operate the plasma arc at a defined operating current; detecting an actual current level of the plasma arc; determining a deviation between the defined operating current and the actual current level; responsive to determining that the deviation is below a threshold error level, permitting the plasma torch to continue operating; after a predetermined sample cycle time, redetecting an actual current level of the plasma arc to determine an updated deviation between the defined operating current and the redetected actual current level; and responsive to determining that the updated deviation meets or exceeds the threshold error level, initiating a plasma arc extinguishing sequence to extinguish the plasma arc to limit damage to the plasma torch body.

Embodiments can include one or more of the following features.

In some embodiments, the method also includes a third or more detection and comparison sequence of the actual current level of the plasma arc to the defined operating current. In some embodiments, the updated deviation comprises a rolling sum of deviations determined during a set of detection and comparison sequences. In some cases, the updated deviation comprises a rolling sum of deviations determined during a set of about 5 to about 20 detection and comparison sequences. In some cases, the updated deviation comprises a rolling sum of deviations determined during a set of about 10 detection and comparison sequences. In some embodiments, the method further includes referencing a lookup table of example threshold error levels. In some cases, the lookup table comprises multiple threshold error levels. In some embodiments, the arc extinguishing sequence comprises causing a decrease in arc current. In some embodiments, the arc extinguishing sequence is completed in less than about 70 milliseconds.

In some aspects, plasma arc material processing systems can include a plasma arc torch including a torch body configured to receive a set of consumable components connected to the torch body and configured to generate a plasma arc; and a power supply operably connected to the torch, the power supply comprising: a means for determining a specified conductivity parameter set point of a current to be provided to the plasma arc torch for a material processing operation; a means for measuring a detected conductivity parameter of plasma arc current being provided to the plasma torch to perform the material processing operation; a means for comparing the specified conductivity parameter set point to the detected conductivity parameter of plasma arc current and calculating an error term signal; and a means for, based on a determination that the error term signal exceeds a threshold amount, initiating a plasma arc shut down sequence to extinguish the plasma arc to limit damage to the plasma arc torch body.

In some aspects, methods, and systems and means for carrying out the methods, of initiating a plasma arc of a plasma arc torch to pierce a workpiece and detecting plasma piercing through the workpiece to begin a cutting sequence can include calculating a pulse width modulation characteristic of an electrical signal associated with a plasma arc between an electrode of a plasma arc torch and a workpiece to be processed; monitoring the characteristic during operation of the torch over a time period of a workpiece piercing sequence; comparing the characteristic to a threshold value; and responsive to determining that a calculated characteristic meets and/or exceeds the threshold value, ending the workpiece piercing sequence and beginning the cutting sequence and causing the plasma arc torch to move relative to the workpiece to form a cut.

Embodiments can include one or more of the following features.

In some embodiments, the characteristic comprises a rate of change of a pulse width modulation control parameter. In some cases, the characteristic comprises a rate of change of a pulse width modulation duty cycle. In some embodiments, the comparing the characteristic comprises referencing a lookup table of threshold values for a particular cutting process. In some cases, the lookup table comprises multiple threshold values, each being associated with a set of cutting parameters. In some embodiments, the methods also include, during the piercing sequence, delivering a gas mixture comprising an inert gas as a plasma gas and/or a shield gas to surround the plasma, the presence of the inert gas reducing a maximum plasma arc voltage required to break through the workpiece during the piercing sequence. In some embodiments, the beginning the cutting sequence comprises changing at least one of a plasma gas or a shield gas from piercing gas mixture comprising an inert gas to a different gas mixture. In some cases, the piercing gas mixture comprising the inert gas is a plasma gas. In some cases, the piercing gas mixture comprising the inert gas is a shield gas and the different gas mixture comprising air of oxygen for the cutting sequence. In some embodiments, the beginning the cutting sequence and causing the plasma arc torch to move relative to the workpiece to form the cut comprises sending a signal, from the power supply to a gantry controller, to cause relative motion between the torch and the workpiece.

In some aspects, methods, and systems and means for carrying out the methods, of performing a piercing sequence to pierce a hole in a workpiece with a plasma arc torch can include initiating an arc between the electrode and a nozzle of the plasma arc torch during a pilot arc mode; transferring the arc from the nozzle to a workpiece for piercing and cutting the workpiece; beginning a workpiece piercing sequence; estimating a characteristic associated with a pulse width modulated signal being provided to the power module to maintain the arc between the torch and the workpiece during the workpiece piercing sequence; comparing the characteristic to a predetermined value; and responsive to determining that an estimated characteristic meets and/or exceeds the predetermined value, initiating relative movement between the workpiece and the plasma arc torch to begin a cutting sequence.

Embodiments can include one or more of the following features.

In some embodiments, the characteristic comprises a pulse width modulation control parameter. In some cases, the characteristic comprises a rate of change of a pulse width modulation duty cycle. In some embodiments, the initiating relative movement between the workpiece and the plasma arc torch comprises sending a signal from a power supply in communication with the plasma arc torch to a movement controller mechanically coupled to the plasma arc torch. In some embodiments, the determining that the estimated characteristic meets and/or exceeds the predetermined value identifies that plasma from the plasma arc torch has broken through the workpiece. In some embodiments, the initiating relative movement between the workpiece and the plasma arc torch is delayed by a predetermined time period. In some embodiments, delaying the initiating relative movement opens a semi-conical pierced hole in the workpiece into a substantially cylindrical pierced hole using plasma expelled from the plasma arc torch.

In some aspects, methods, and systems and means for carrying out the methods, for increasing a usable number of pierce operations for an electrode of a plasma arc torch can include initiating an arc between the electrode and a corresponding nozzle of the plasma arc torch during a pilot arc mode; transferring the arc from the corresponding nozzle to a workpiece for piercing and cutting the workpiece; increasing a current of the plasma arc; delivering a gas mixture comprising an inert gas as at least one of a plasma gas or a shield gas to surround the arc and initiating a piercing sequence; responsive to determining that the piercing sequence has completed, beginning a cutting sequence and moving the plasma arc torch relative to the workpiece.

Embodiments can include one or more of the following features.

In some embodiments, the presence of the inert gas reduces a maximum plasma arc voltage required to break through the workpiece during the piercing sequence. In some embodiments, the presence of the inert gas increases an arc attachment time during the piercing sequence. In some embodiments, the presence of the inert gas increases a workpiece piercing time. In some embodiments, the beginning a cutting sequence comprises providing a motion signal to a CNC controller to initiate relative motion between the torch and the workpiece. In some embodiments, the beginning a cutting sequence comprises delivering a second gas mixture to surround the arc that is distinct from gas mixture delivered during the piercing sequence. In some embodiments, the gas mixture comprises an inert gas as a plasma gas during the piercing sequence. In some embodiments, the gas mixture delivered during the piercing sequence comprises a plasma gas comprising argon and a shield gas comprising oxygen, and the beginning a cutting sequence comprises delivering a second gas mixture to surround the arc comprising a plasma gas comprising nitrogen and a shield gas comprising argon. In some embodiments, the gas mixture comprising the inert gas is delivered from a metering console located on or near the plasma arc torch. In some embodiments, the determining that the piercing sequence has completed comprises: estimating and monitoring a characteristic of an electrical signal associated with the arc between the electrode and the workpiece; comparing the characteristic to a threshold value; and determining that an estimated characteristic meets and/or exceeds the threshold value. In some cases, the characteristic comprises a pulse width modulation control parameter or a rate of change of a pulse width modulation control parameter.

In some aspects, methods, and systems and means for carrying out the methods, of operating a plasma arc torch can include operating the plasma arc torch in an arc initiation mode by generating an arc between an electrode and a nozzle in the presence of a first set of shield and plasma gases; operating the plasma arc torch in a transferred piercing mode by transferring the arc from the nozzle to a workpiece in the presence of a second set of shield and/or plasma gases, at least one of the shield or plasma gases of the second set at least partially comprising an inert gas; and based on determining that the arc has fully pierced the workpiece, operating the plasma arc torch in a transferred cutting mode by moving the torch relative to the workpiece in the presence of a third set of shield and plasma gases.

Embodiments can include one or more of the following features.

In some embodiments, the operating the plasma arc torch in a transferred cutting mode comprises providing a motion signal to a CNC controller to initiate the moving the torch. In some embodiments, the third set of shield and plasma gases is distinct from the second set. In some embodiments, the inert gas of the second set increases a length of time required to fully pierce the workpiece. In some embodiments, the inert gas of the second set reduces a maximum plasma arc voltage required to fully pierce the workpiece. In some embodiments, the determining that the arc has fully pierced the workpiece comprises: estimating and monitoring a characteristic of an electrical signal associated with the arc between the electrode and the workpiece; comparing the characteristic to a threshold value; and determining that an estimated characteristic meets and/or exceeds the threshold value. In some cases, the characteristic comprises a rate of change of arc voltage or pulse width modulation duty cycle. In some embodiments, the characteristic comprises a pulse width modulation control parameter.

In some aspects, plasma arc material processing systems can include a plasma arc torch including a torch body configured to receive a set of consumable components connected to the torch body and configured to generate a plasma arc; and a power supply operably connected to the torch, the power supply comprising: a means for calculating a pulse width modulation characteristic of an electrical signal associated with the plasma arc between an electrode of a plasma arc torch and a workpiece to be processed; a means for monitoring the characteristic during operation of the torch over a time period of a workpiece piercing sequence; a means for comparing the characteristic to a threshold value; and a means for responsive to determining that a calculated characteristic meets and/or exceeds the threshold value, ending the workpiece piercing sequence and beginning the cutting sequence and causing the plasma arc torch to move relative to the workpiece to form a cut.

DETAILED DESCRIPTION

In some aspects, as discussed herein, the systems and methods described herein can include a power supply having one or more precisely and dynamically monitored and controlled electrical and gas parameters of the plasma arc torch, including plasma arc current and pulse width modulation control thereof, plasma gas flow, and/or shield gas flow, can be achieved using the system designs herein. The precise control of these systems has been found to be useful to implement several advantageous torch control methods described herein. Example methods, as discussed in detail herein, include ramp-down error detection and prevention sequences by detecting a lengthening of a plasma arc, more accurate consumable failure prediction by determining errors or deviations in plasma arc current set points and actual plasma arc current and implemented torch protection sequences, and improved workpiece piercing sequences such as more accurate workpiece piercing detection by calculating variations in electrical parameters (e.g., changes in arc voltage or pulse width modulation values providing current to the plasma arc).

Figure 1:
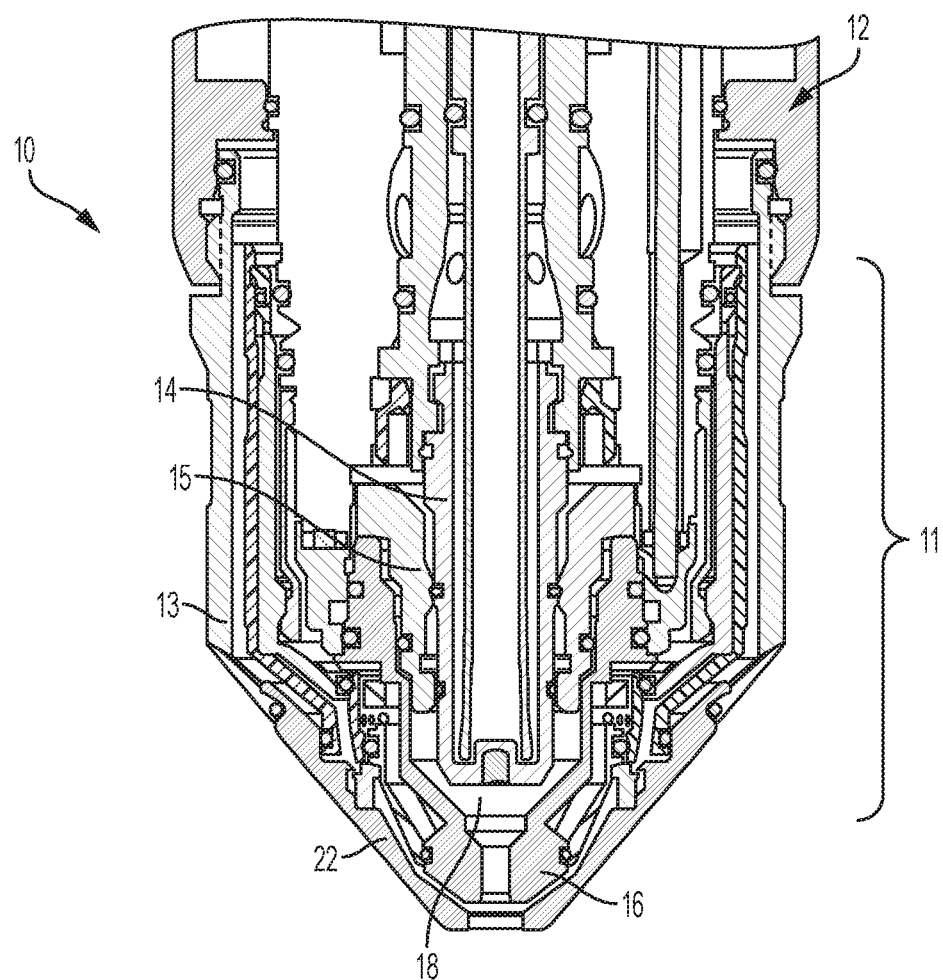
FIG. 1 is a cross-sectional view of an example plasma arc torch.

Referring to FIG. 1, an example plasma arc torch 10 can include a torch body 12 and a torch tip 11. The torch tip 11 includes multiple consumables, for example, an electrode 14, a nozzle 16, a retaining cap 13, a swirl ring 15, and a shield 22. The torch body 12, which has a generally cylindrical shape, supports the electrode 14 and the nozzle 16. The nozzle 16 is spaced from the electrode 14 and has a central exit orifice mounted within the torch body 12. The swirl ring 15 is mounted to the torch body 12 and can have a set of radially offset or canted gas distribution holes that impart a tangential velocity component to the plasma gas flow, causing the plasma gas flow to swirl around the electrode 14. The shield 22, which also includes an exit orifice, is connected (e.g., threaded) to the retaining cap 13 or torch body. The torch 10 can additionally include electrical connections, passages for cooling, passages for arc control fluids (e.g., plasma gas), and a power supply. In some examples, the torch can include a switch (e.g., a trigger switch) that can be used to send a signal to the power supply to initiate generation of a plasma arc by the power supply. Based on this signal, the electric components within the power supply may generate and modulate the signal provided to the torch to control ignition and cutting operations.

In operation, plasma gas flows through a gas inlet tube (not shown) and the gas distribution holes in the swirl ring 15. In some cases, the torch can include a gas connection to fluidly couple the torch to a metering console. As discussed below, the metering console can be used to provide gases, such as non-oxidative gases (e.g., inert gases (e.g., argon gases)) to the torch for carrying out various processes. From there, the plasma gas flows into a plasma chamber 18 and out of the torch 10 through the exit orifices of the nozzle 16 and the shield 22. To operate the torch and generate a plasma jet, a pilot arc is typically first generated between the electrode 14 and the nozzle 16. The pilot arc ionizes the gas passing through the nozzle exit orifice and the shield exit orifice. This can be referred to as pilot arc mode. The arc can then be transferred from the nozzle 16 to a workpiece (not shown) for thermally processing (e.g., cutting, gouging, or welding) the workpiece. It is noted that the illustrated details of the torch 10, including the arrangement of the components, the direction of gas and cooling fluid flows, and the electrical connections, can take a variety of forms.

Figure 2:
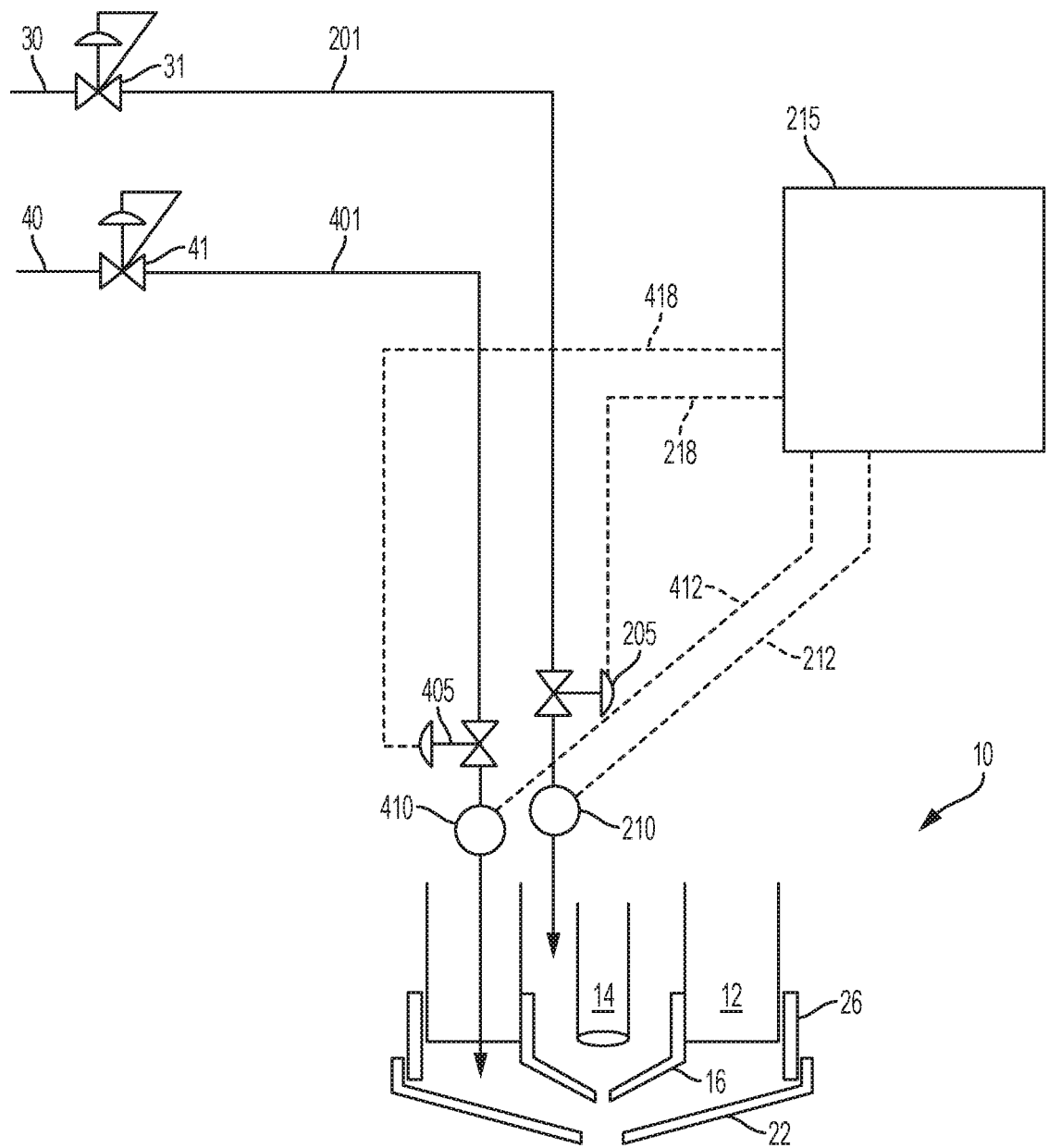
FIG. 2 is a schematic representation of an example combined plasma gas and shield gas supply system to a plasma arc torch.

The torch 10 is typically electrically and fluidly connected to a plasma arc system power supply to provide energy (e.g., electricity) to the torch 10 to sustain a plasma arc during a desired torch operation. A power supply can include a housing that serves as an enclosure for various electrical and fluidic components of the power supply. For example, various systems and devices can be implemented to deliver gases and liquids to the torch in the form of a plasma gas delivered to the plasma chamber 18 between the electrode 14 and the nozzle in which a plasma arc can be formed or a shield gas between the nozzle 16 and the shield 22. For example, FIG. 2 is a schematic representation of a combined plasma gas and shield gas supply system to a plasma arc torch. A plasma gas programmable control valve 205, such as a proportional solenoid control valve, is positioned adjacent the torch 10 in the plasma gas supply line 201. A shield gas programmable control valve 405, such as a proportional solenoid control valve, can be positioned adjacent and/or in the torch 10 in the shield gas supply line 401. Optionally, a sensor 210 can be present in the plasma gas line 201 and provide a control signal 212 to a DSP 215. Also optionally, a sensor 410 can be present in the shield gas supply line 401 and provide a control signal 412 to DSP 215. The sensors 210, 410 can measure different types of physical parameters, such as flow, pressure, and others, such as those described above.

The precise and dynamic real-time control of the plasma arc torch, including plasma arc current and pulse width modulation control thereof, plasma gas flow, and/or shield gas flow, can be achieved using the system designs herein. The precise control of these systems has been found to be useful to implement several advantageous torch control methods described herein. Example methods described herein include ramp-down error detection and prevention sequences, more accurate consumable failure prediction and detection and implemented torch protection sequences, and improved workpiece piercing sequences such as more accurate workpiece piercing detection or optimized.

Specifically, in a first aspect, the precise and dynamic control by the systems described herein can be used to prolong electrode life by reducing plasma torch ramp-down errors. A ramp-down error (RDE) can occur when the plasma system experiences a sudden loss of the plasma arc, for example, when the plasma torch runs off of the workpiece and is unable to complete the coordinated ramp-down of plasma gas plenum pressure and cutting current (which in some cases is referred to as "Long Life Technology"). The sudden loss of the arc can cause increased hafnium wear, especially in the presence of oxygen. For example, in some cases, without a proper arc extinguishing sequence, when the plasma arc is immediately lost, the high pressure of the plasma gas continuing to flow as if the plasma arc is still connected to the workpiece can blow away molten emitter material, which can lead to the wear. Thus, precise and accurate plasma gas ramping techniques can be especially useful for prolonging electrode life when the steady state cutting process is transitioned to torch shutdown (i.e., extinguishing the arc). That is, in this aspect, the power supply can predict/detect an undesired arc loss, which could otherwise cause unnecessary wear to the electrode, and take action to limit such unnecessary wear to prolong life of the electrode.

For example, when the plasma torch travels beyond the edge of the material, the plasma arc stretches (e.g., as the distance between the torch and the edge of the workpiece (e.g., the arc attachment point) increases) and causes the PWM values of the system to vary accordingly. The increase in pulse width modulation duty cycle is a result of the chopper controller adjusting the pulse width modulator to maintain a desired current. Therefore, the systems herein can monitor these electrical, system, and control parameters to predict when a plasma arc is about to be lost. In response, the power supply can quickly take action to prevent sudden loss of the arc, which could result in electrode wear and a shorter lifetime. As discussed below, this quick action to prevent sudden loss of the arc can include adjusting electrical parameters of the arc, gas flows to the torch, or motion of the torch itself. While a summary of an aspect of this application is provided herein, more embodiments and details are provided below.

In a second aspect, as detailed below, the precise and dynamic control by the systems described herein can be used to protect a plasma torch from damage that could result from failing consumables. That is, in some conventional devices, consumables, such as electrodes can wear to a point of catastrophic failure. In some cases, a consumable can wear until it falls apart (e.g., an end of the electrode can blow off), which causes damage to the torch in which the electrode is installed. However, the inventors of the present application have discovered that as an electrode approaches failure, variations in the plasma arc current (e.g., the set current vs. the actual current) can be observed. Thus by monitoring electrical parameters of the plasma arc system, such as plasma arc current, the power supply can predict an impending consumable failure and quickly take action to prevent such failure and thereby also limit damage to the torch. As discussed below, for example, the power supply can monitor a current set point as compared to the actual current of the plasma arc. Once an error between the set and actual current reaches a threshold level, the power supply can take rapid action to prevent further damage. In some cases, for example, the power supply can shut down and lock from further use until the consumables are replaced. In some embodiments, as discussed below, fluctuations in coolant temperature can additionally or alternatively be used to predict an impending consumable failure. That is, in some cases, rising coolant fluid temperatures can be indicative of impending consumable failure. In some cases, arc current and coolant temperature can be used in a complementary fashion in which the coolant temperature can be viewed as a warning indicator of a possible failure and the arc current can provide a more conclusive notice of an impending failure. While a summary of an aspect of this application is provided herein, more embodiments and details are provided below.

In a third aspect, the precise electrical and gas delivery systems described herein can be used to predict (e.g., using the power supply itself) when a workpiece piercing sequence has completed so that the torch can be moved and a material processing operation can begin. By enabling pierce detection, various processing parameters can be adjusted to increase plasma torch performance. As detailed below, prior conventional systems typically pierce for a predetermined time before proceeding with moving the torch to perform a cut. This can result in unnecessarily long cutting times, unnecessary electrode wear, or undesired workpiece damage. However, in some embodiments, the arc voltage estimation systems herein having precise and fast control can be used to detect when the plasma arc has successfully pierced the workpiece to begin motion of the plasma torch and/or to alter the gases delivered for cutting. Accurately knowing once a workpiece has been pierced can be useful to begin a cutting as soon as practical after piercing, instead of unnecessarily remaining in place after piercing, as is done in prior conventional systems. In some embodiments, as detailed below, the time when the arc pierces the workpiece can be detected by monitoring one or more electrical signal(s) in a power supply generating a plasma arc signal, such as a pulse width modulation parameter (or rate of change thereof) or a voltage parameter (e.g., rate of voltage change over time (dV/dt)), one or more threshold values, or some combination of both.

In a fourth aspect, the precise and fast acting gas and electrical systems described herein can be used to implement techniques during piercing to increase the usable life of an electrode (e.g., the number of piercing sequences for which an electrode can be used). For example, performing a pierce sequence in the presence of a non-oxidative gas, such as an inert gas (e.g., an argon gas or a nitrogen gas), can help to create an environment in which the voltage needed to complete the pierce is reduced. As a result of the lower voltage for piercing, a plasma arc electrode can be used for a greater number of piercing operations. For example, the inert gas (e.g., argon or nitrogen gas) and lower voltages can permit the torch to be further away from the workpiece during piercing (e.g., have a higher standoff height), which can also help increase the usable life. For example, in some cases, the greater standoff height can help reduce molten workpiece material spatter from adhering to the torch (e.g., consumables). As described herein, reduced gas volumes in the torch and gas valves that deliver shield and/or plasma gas to a torch can be located closer to the torch itself rather than at position far away (e.g., at the opposite end of a plasma lead line), as with some conventional systems. As a result of the valves being close to the torch and the system working with smaller gas volumes, the gases can be changed quickly and efficiently, making the gas delivery methods herein more feasible.

To achieve the inventive methods described in the aspects above, gas flow and electrical properties ramp up and ramp down techniques for the plasma and/or shield gases can be implemented, e.g., automatically, using DSP 215 (e.g., a CNC). In some embodiments, cut tables including specific cut information based on variables such as those identified above can be used. These parameters can be stored, e.g., in electronic form, in a "cut table" for quick reference and utilization by the cut program. Thus, the cut table can store cutting shapes and parameters for ready reference by the cut program or, e.g., for selection and use by the equipment operator. Using such a system, automated control of torch current levels and gas flow rates can be utilized for consistent cutting operations. Such a system can be employed to take advantage of specific cutting information that has been previously optimized in view of the many inter-related variables that affect cutting operations.

Figure 3:
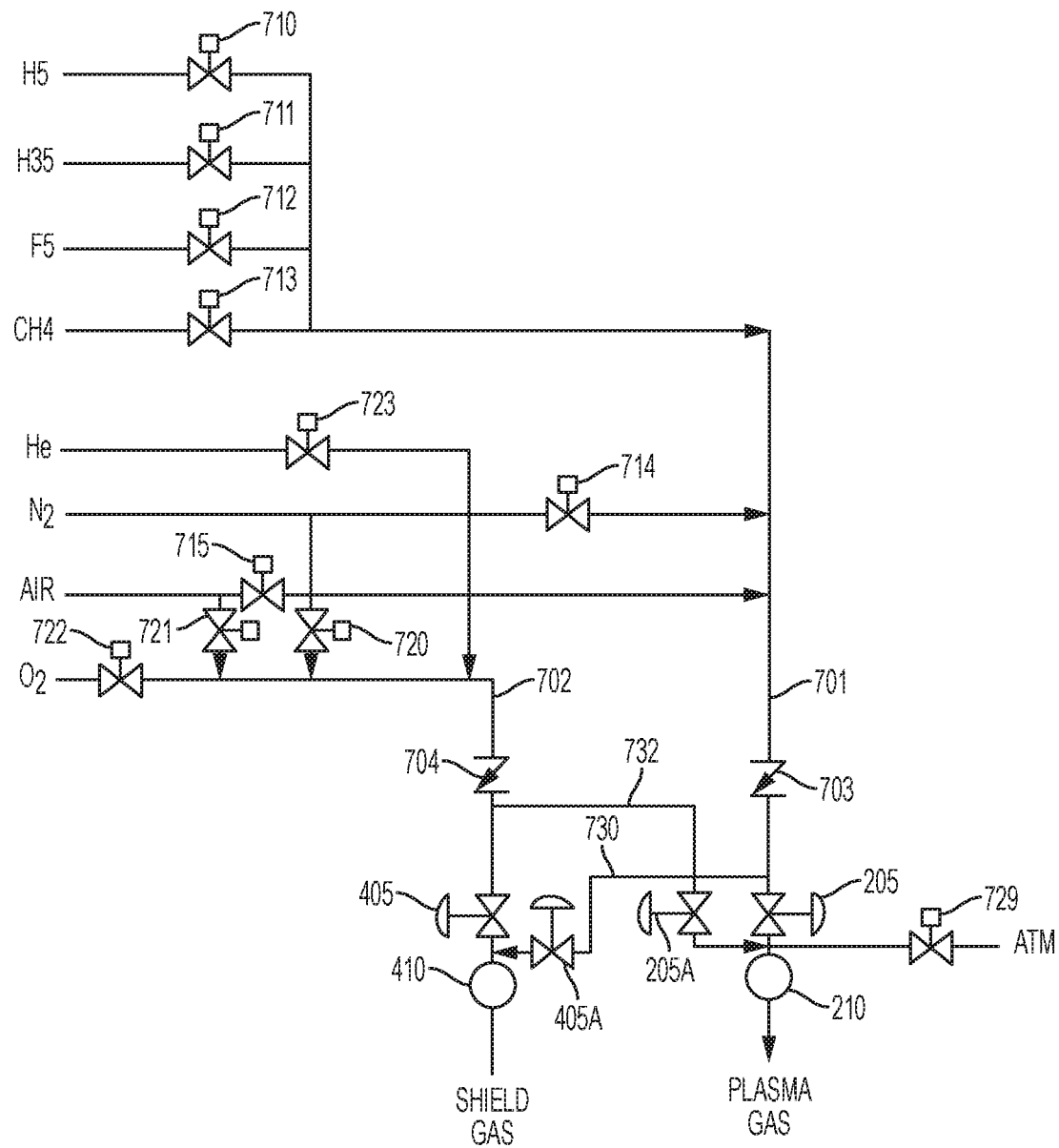
FIG. 3 is another schematic representation of an example combined plasma gas and shield gas supply system to a plasma arc torch.

FIG. 3 is a schematic representation of another example combined plasma gas and shield gas supply system to a plasma arc torch, which provides enhanced operating flexibility. Specifically, FIG. 3 illustrates how multiple (e.g., seven in this example) different supply gases can be incorporated into a system providing two cut gases 701, 702, each cut gas being available to provide plasma gas and/or shield gas. For example, different plasma or shield gas compositions can be preferred when cutting different workpiece materials or thicknesses. Additionally or alternatively, in some embodiments, different plasma gas compositions can be preferred for different aspects of a material processing sequence, such as a pilot arc initiation sequence (e.g., pilot arc mode), a workpiece piercing sequence (e.g., piercing mode), and a subsequent workpiece cutting sequence (e.g., cutting mode). In some cases, as detailed herein, one or more non-oxidative gases, such as gases comprising argon, can be used during a workpiece piercing mode, which can provide a beneficial environment for piercing a workpiece. For example, in some embodiments, a presence of argon gases during a workpiece piercing sequence can be useful to reduce a plasma arc voltage required to fully pierce the workpiece. The reduced voltage required can also be useful for preserving or extending the usable life of the plasma arc electrode by increasing the number of piercing sequences that an electrode can undergo before failure.

In some embodiments, as depicted in the example system FIG. 3, a system can supply a gas having a first, high argon content (e.g., H5 (about 5% hydrogen content, about 95% argon)) via a valve (e.g., a solenoid valve) 710, a gas having a second, lesser argon content (e.g., H35 (about 35% hydrogen content, about 65% argon content)) via a valve 711, a gas having a high nitrogen content (e.g., F5 (about 5% hydrogen content, about 95% nitrogen)) via a valve 712, and/or methane (CH4) via a valve 713 as a first cut gas (e.g., as a plasma gas) 701. Nitrogen (N2), for example, as the first cut gas, can also be supplied via a valve 714. Air can also be supplied as the first cut gas via a valve 715. A check valve 703 can be included in the first cut gas line. This first cut gas 701 can be channeled through a plasma gas programmable control valve 205 positioned adjacent the plasma torch, and through sensor 210 as described above. While certain example gases have been described above for the first cut gas (e.g., the plasma gas), these are provided as examples only. Thus, the systems and methods described herein can be used to deliver any of various gas combinations to the plasma torch for use. Additionally, the various valves can be used to provide different gases to the torch during different cutting sequences.

Nitrogen can also be supplied as a second cut gas (e.g., a shield gas) 702 via on-off solenoid valve 720, air via a valve 721, helium via a valve 723, and O2 (oxygen) via a valve 722. A check valve 704 can be included in the second cut gas line. As illustrated, the second cut gas can be used as a shield gas, which can pass through a shield gas programmable control valve 405 positioned adjacent to the plasma arc torch, and through sensor 410 as described above. Although not shown, a DSP 215 can be used to manipulate, e.g., the programmable control valves 205, 205A, 405, and 405A, and/or some or all of the valves 710, 711, 712, 713, 714, 715, 720, 721, 722, and 729. The valves described herein can include various types of valves, such as selection valves or three-way valves. Additionally, the valves described herein can have improved response times, such as on the order of about 5 milliseconds to about 40 milliseconds. It is noted that the improved valve response times, in addition to reduced gas volumes within the torch, can improve consistency of the torch operation, such as switching gases delivered to the torch or implementing torch shut-down sequences.

While certain example gases have been described above for the second cut gas (e.g., the shield gas), these are provided as examples only. Thus, the systems and methods described herein can be used to deliver any of various gas combinations to the plasma torch for use. Additionally, the various valves can be used to provide different gases to the torch during different cutting sequences. Moreover, while certain gases have been described as being possible for the first cut gas or the second cut gas, one skilled of the art would understand that the various example gases, or other gases described herein, can be used as first cut gases or second cut gases according to the various sequences described herein and in the claims.

Some examples, as depicted in FIG. 3, can also feature crossover lines 730 and 732. That is, the crossover line 730 delivers the first cut gas (e.g., the plasma gas) 701 to be used as a shield gas; and the crossover line 732 delivers the second cut gas (e.g., the shield gas) 702 to be used as a plasma gas. Each of the crossover lines can include valve (e.g., a programmable control valve) 205A, 405A, such as a proportional solenoid control valve, which can be used to control the amount of crossover gas flow. For embodiments incorporating crossover flow, it is typically useful that crossover programmable control valves 205A, 405A be positioned adjacent or within the plasma arc torch. Crossover gas flow can be used to augment or replace other gases already flowing in the system.

Although the above discussion has focused primarily on programmable control valves (e.g., 205, 405) that are located adjacent the torch (e.g., within 2 feet, 6 feet, or 10 feet of the torch), some embodiments also include torches into which the programmable control valve functionality has been integrated. For example, the plasma torch and a programmable control valve can be a unitary assembly, i.e., with no connecting hose between the two. Such closely-coupled embodiments include a programmable control valve that is directly attached, i.e., directly coupled (e.g., bolted) to the housing of a plasma torch. In some embodiments, the programmable control valve apparatus is disposed within the plasma torch body. Locating programmable control valve functionality (e.g., for the plasma gas or the shield gas) within the torch reduces the number of external components present in a plasma torch system.

While some example gas delivery system configurations have been described above, other embodiments are possible. Specifically, while some examples are described in which gases used for operating the plasma arc torch (e.g., plasma or shield gases) are located off of (e.g., substantially away from (e.g., at an opposite end of a torch lead hose)) the torch, other examples can include gas supplies located at different locations. For example, in some embodiments, gases used to assist in workpiece piercing (e.g., argon) can be located closer to the torch than some other gases. In some cases, locating a pierce assist gas closer to the torch than at the opposite end of the torch lead hose relative to the torch, such as at metering console fluidly connected to the torch, can be used to better control gas delivered to the torch during a piercing operation. For example, the metering console can control delivery of the pierce assist more quickly and more precisely than some conventional gas delivery techniques. The metering console is illustrated and described in more detail below with respect to FIG. 12.

Also illustrated in FIG. 3 is an optional vent valve 729 that can be used to vent plasma gas to the atmosphere (ATM). A vent valve 729 can be an on-off solenoid valve. In some embodiments, a vent valve 729 can be a programmable control valve. A programmable control valve vent valve 729 can be useful when cutting conditions are encountered in which it is desirable to decrease the flow rate of plasma gas flowing to the plasma chamber 207 more rapidly than is possible with only the plasma gas programmable control valve(s) 205, 205A (e.g., to improve ramp-down times). In some embodiments, vent valve 729 can be two or more on-off solenoid valves mounted in parallel, providing for increased venting capacity and control. The two or more vent valves can be operated independently or simultaneously and can have different sizes (i.e., different valve coefficients (Cv's)).

Of course, other combinations are possible. Gas supplies other than those illustrated can be used, and various techniques known to those of skill in the art can be used, e.g., to mix different gas sources. For example, a plasma gas mixture can be formed by mixing methane and H35 using techniques and instrumentation (not shown) known to the skilled artisan. In addition to the mixing techniques described above using crossover lines 730 and 732, additional gas supplies can be added adjacent the torch and these additional gas supplies can be controlled using programmable control valves. For example, some embodiments include adding a reducing gas stream (such as methane) to the shield gas between programmable control valve 405 and sensor 410, such that the flow of the reducing gas is controlled with a programmable control valve. More than one additional gas (such as the reducing gas stream) can be added in this manner. Similar techniques can be used for the plasma gas. Many other arrangements and combinations are also possible.

Figure 12:
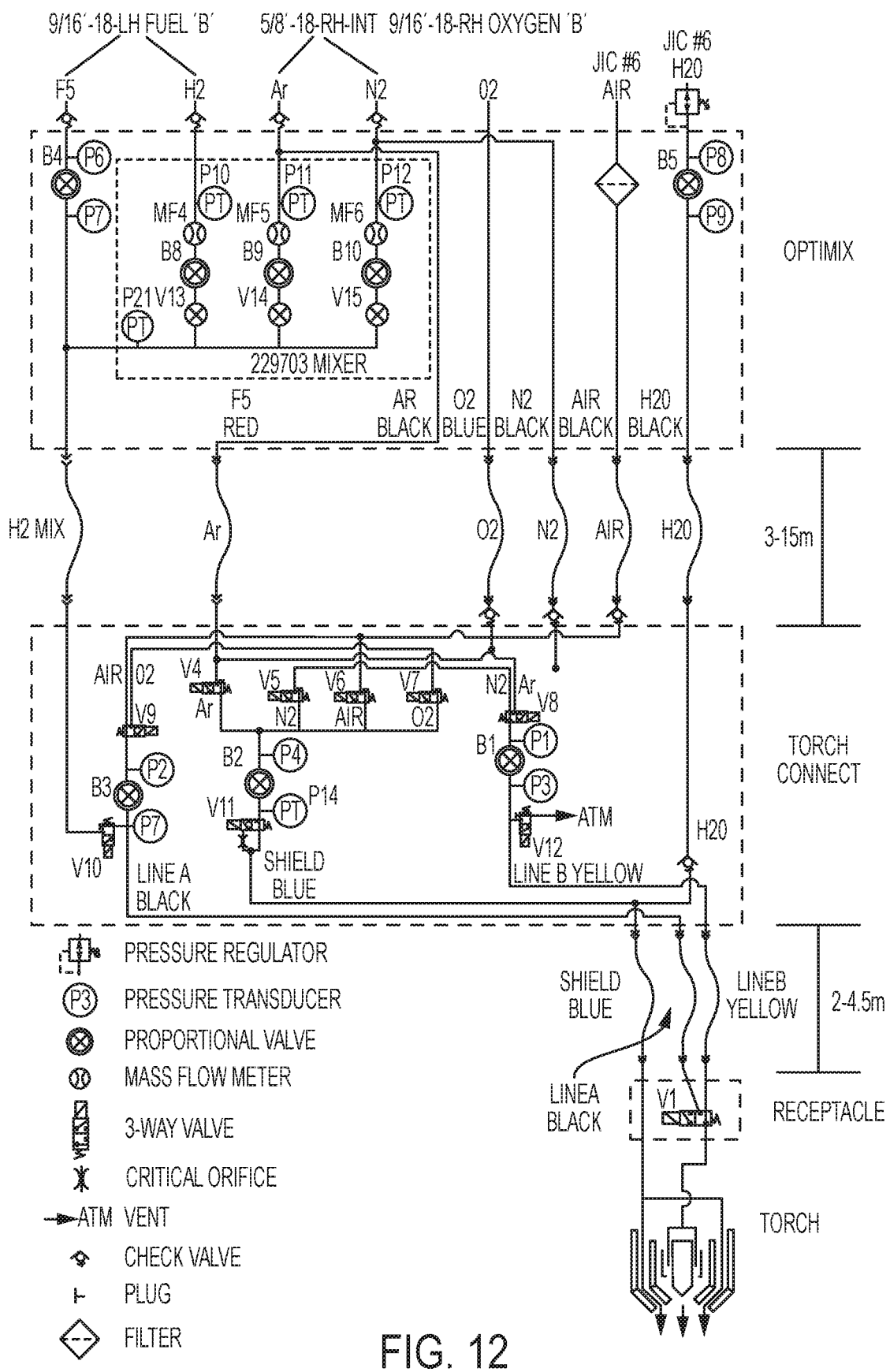
FIG. 12 is schematic diagram of another example combined plasma gas and shield gas supply system to a plasma arc torch, illustrating distances between the torch and gas distribution valves.

Another example gas delivery configuration is depicted in FIG. 12. As illustrated, the system can provide various gases, such as F5, H2, Ar, N2, O2, and air to several valves fluidly connected to the torch to provide shield and plasma gases. As depicted, the valves (e.g., three-way valves) that direct gas to the torch can be disposed in a torch connect module that is about 2 meters to about 4.5 meters from the torch. Whereas, the gas supplies can be disposed about 3 meters to about 15 meters from the torch connect module.

As discussed below, gases can be delivered to the torch, for example as plasma gases or shield gases, in various sequences in order to implement the torch operation techniques described herein, including torch initiation, workpiece piercing, or cutting sequences. Unless otherwise stated herein, the various gas delivery methods and sequences below can be implemented using the above described gas delivery systems.

Figure 4:
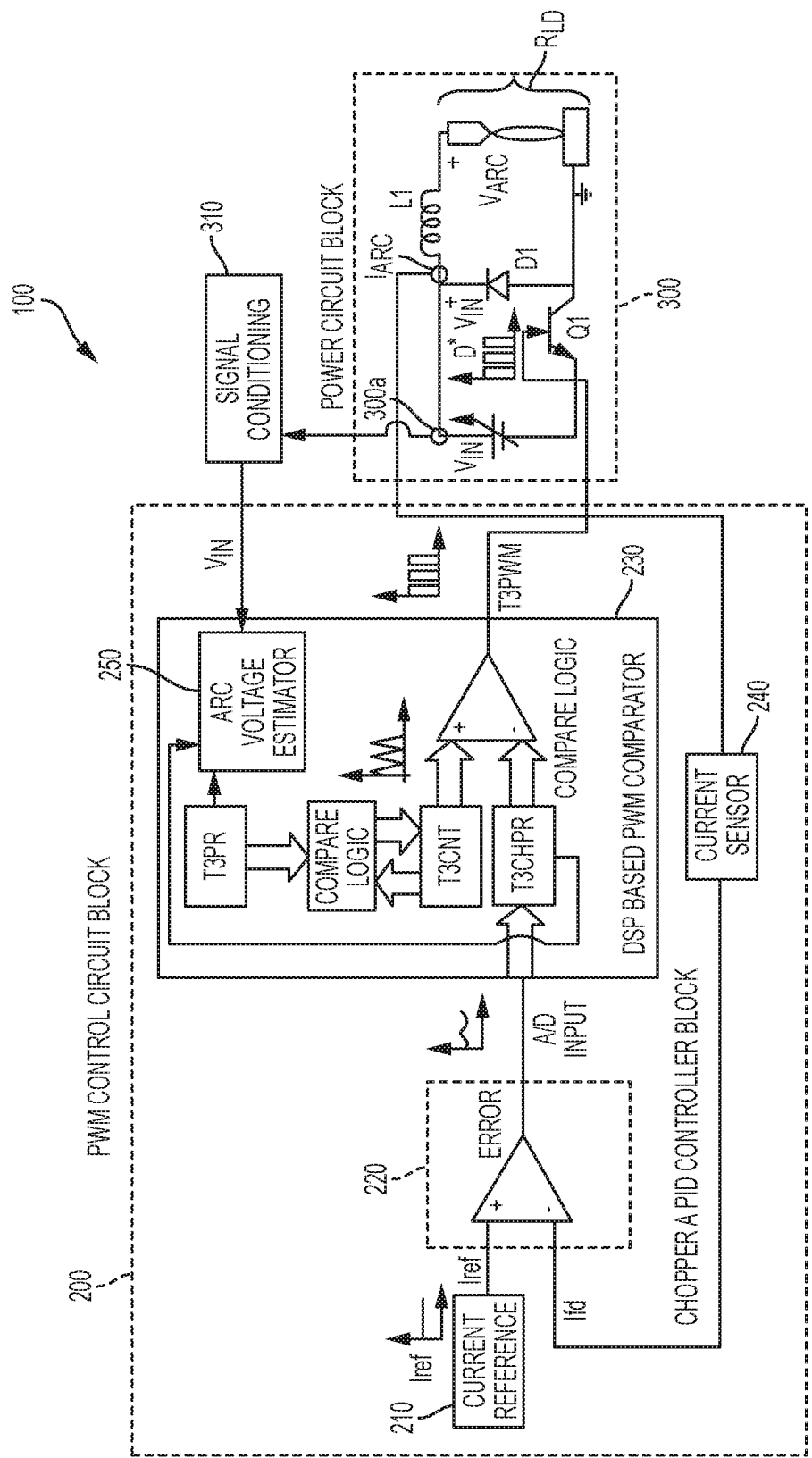
FIG. 4 is a schematic circuit diagram of an example power control block that includes an arc voltage estimation module.

Alone or in combination with the various gas delivery systems described herein, electrical systems for controlling and operating a plasma arc torch can be used to estimate (e.g., or determine) one or more electrical characteristics, which can be used to implement one or more processing sequences. In some embodiments, for example, the plasma arc system can estimate certain physical characteristics of a cutting sequence and implement a response to such physical characteristics. For example, FIG. 4 is a circuit diagram of a power control block of a power supply that includes an arc voltage estimation module. As shown, the circuit 100 includes a Pulse Width Modulation (PWM) control circuit block 200 coupled to a power circuit block 300. The power circuit block 300 can be a switched mode power supply that includes an unregulated input voltage source $V_{IN}$, a power transistor switch-diode combination Q1, D1, an output filter inductor L1 and a plasma arc load $R_{LD}$. The power circuit block 300 can operate as a standard chopper such that the output current $I_{ARC}$ through the arc load $R_{LD}$ depends on the duty cycle of the switch Q1. Although the power circuit block 300 shown is a buck converter, other embodiments can include other circuit topologies, including boost, buck-boost and variations thereof.

The PWM control circuit block 200 can provide a gate signal T3PWM to the switch Q1 to control its duty cycle, and thus the output current $I_{ARC}$ through the plasma arc load $R_{LD}$. As shown, the PWM control block 200 includes a current reference block 210, an error control block 220, a feedback current sensor 240, a PWM comparator block 230, and an arc voltage estimation module 250.

A program or an operator of the system can manually set block 210 to a desired current reference $I_{REF}$ at which to maintain the output current $I_{ARC}$. The output current IARC may be monitored using the current sensor 240, such as a Hall current sensor. The current sensor 240 transmits a feedback current $I_{FB}$ to an input of the error control block 220. The error control block 220 can be implemented, for example, as a standard proportional-integral-derivative controller (PID controller) known to those skilled in the art. The error control block 220 compares the feedback current $I_{FB}$ against the desired current reference $I_{REF}$ and outputs a modulating error signal, Error.

The error signal, Error, can then be input to the PWM comparator block 230 where it is sampled and used to generate the appropriate gate signal T3PWM that adjusts the duty cycle of the switch mode power supply 300, thereby correcting for the error in the output current. The PWM comparator block 230 and the arc voltage estimation module 250 can be realized using a digital signal processor (DSP), such as TMS320LF2407 A from Texas Instruments. These control blocks can also be realized using a combination of one or more suitably programmed or dedicated processors (e.g., a microprocessor or microcontroller), hardwired logic, Application Specific Integrated Circuit (ASIC), or a Programmable Logic Device (PLD) (e.g., Field Programmable Gate Array (FPGA)) and the like.

In order to generate the appropriate gate signal T3PWM, the PWM comparator block 230 compares an instantaneous error sample T3CMPR with a carrier wave signal T3CNT. The carrier wave signal can be generated as a sawtooth or triangular carrier wave with its frequency ranging anywhere from hundreds of Hertz (Hz) to MegaHertz (MHz) depending on the application. In a plasma cutting application, the frequency of the carrier wave signal is typically around 15 kHz. The comparator amplifies the difference between the two signals and produces a gate signal T3PWM whose average value over one switching cycle of the carrier wave signal T3CNT is equal to the value of the instantaneous error sample T3CMPR. Application of the gate signal to the switch Q1 adjusts the duty cycle to drive and maintain the output current IARC at a desired steady state value.

Additionally or alternatively to the arc estimation techniques described above, other techniques are possible for estimating the electrical characteristic(s) of the plasma arc. For example, in some embodiments, the duty cycle of a pulse width modulator that provides an electrical signal to the plasma arc torch to create the plasma arc can be monitored and used to estimate any of various physical implications observed during use of the plasma arc torch.

Figure 5:
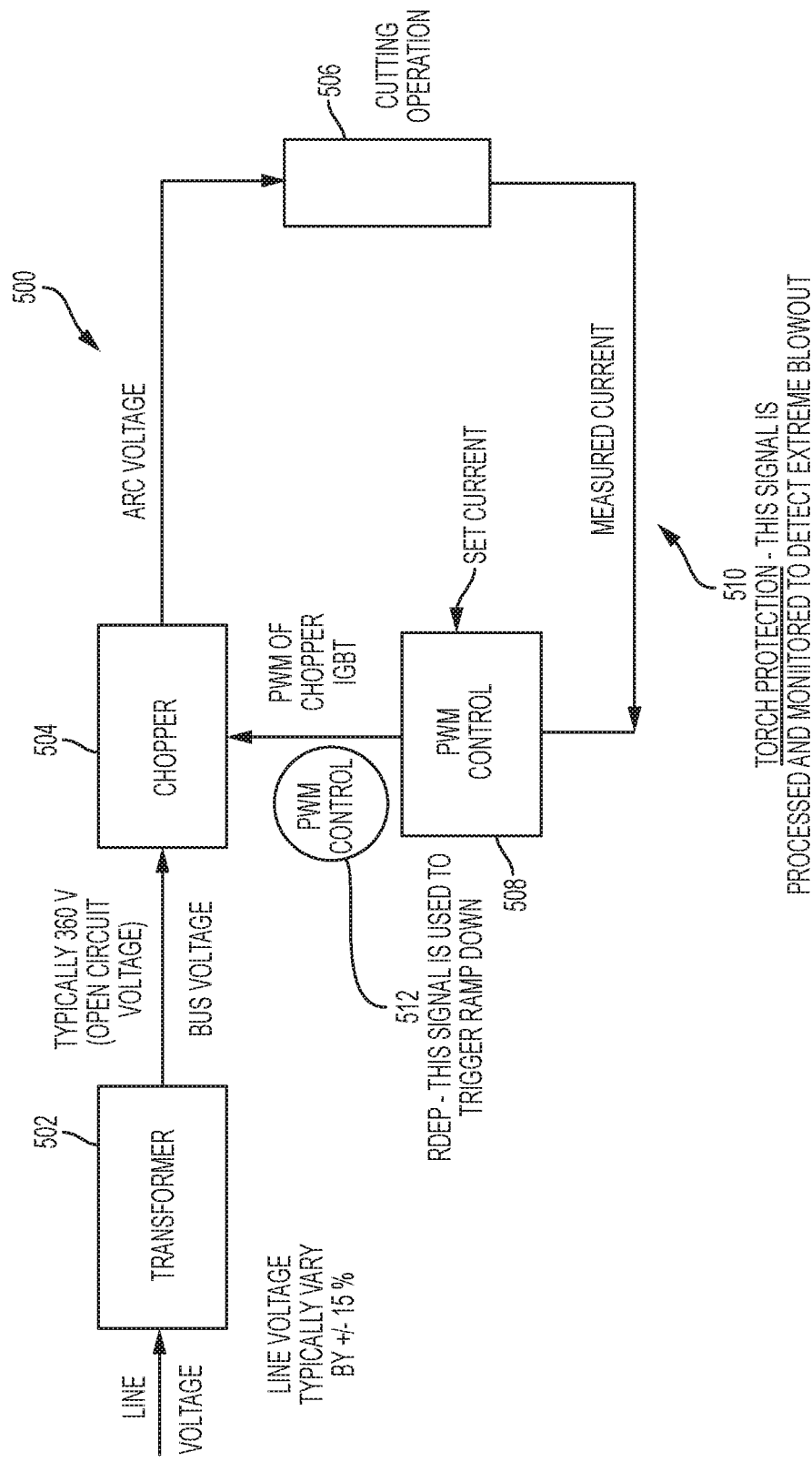
FIG. 5 is a schematic circuit diagram of another example circuit used to provide electricity to form a plasma arc, depicting various measurement points to monitor torch performance.

For example, referring to FIG. 5, in some cases, a power supply system 500 can include a transformer 502 that receives an electrical input (e.g., a line voltage) and converts it into a system signal, such as a bus voltage (e.g., a direct current bus voltage). In some cases, the bus voltage can be at or about 360 volts.

From the transformer 502, the bus voltage can feed to a chopper 504. The chopper 504 can include a switching device that converts fixed DC input (e.g., the bus voltage) to a variable DC output voltage used to generate the electrical signal for the plasma arc. The variable DC output voltage from the chopper 504 can be provided to the torch and used to generate the plasma arc to perform a plasma arc processing operation 506, for example, a cutting operation through a workpiece.

Electricity provided to the workpiece for the processing operation (e.g., the electricity that forms the plasma arc) is transferred through the workpiece and returned back to the power supply system. For example, a closed circuit can be formed with the chopper to maintain the electrical circuit with the workpiece and the power supply system. For example, a pulse width modulation system 508 can be disposed in circuit between the workpiece and a return to the chopper 504. The pulse width modulation control system 508 can be implemented to set a current level (e.g., by adjusting its duty cycle) for the electrical signal that generates the plasma arc. A pulse width modulation (PWM) signal is a method for generating a signal (e.g., an analog signal) using a digital source. For example, the chopper can have an open circuit voltage and during operation the current can be measured and if the current is too low, the pulse width modulation duty cycle can be increased. This sampling and adjustment can be performed periodically (e.g., every 33 microseconds) to adjust the pulse width modulation duty cycle. This adjustment can be viewed as a control loop, and the adjusted pulse width modulation duty cycle can be compared at each loop to the threshold value. For example, a PWM signal consists of two main components that define its behavior: a duty cycle and a frequency. The duty cycle describes the amount of time the signal is in a high (on) state as a percentage of the total time it takes to complete one cycle. The frequency determines how fast the PWM completes a cycle (i.e., 1000 Hz would be 1000 cycles per second), and therefore how fast it switches between high and low states. By cycling a digital signal off and on at a fast enough rate, and with a certain duty cycle, the output will appear to behave like a constant voltage analog signal when providing power to devices. As one skilled in the art would understand, the pulse width modulation control system duty cycle is akin to a throttling mechanism to maintain a set current. That is, in some examples, pulse width modulation is a percent time "on" for the system. For example, systems can be operates at 15 kHz which is a time period of 66 microseconds, the PWM is the percent on time. For example, to create a 3V signal given a digital source that can be either high (on) at 5V or low (off) at 0V, one can use PWM with a duty cycle of 60% which outputs 5V 60% of the time. Thus, there the signal is "on" for 60% of the time (e.g., a 60% "on" time). If the digital signal is cycled fast enough, then the voltage seen at the output appears to be the average voltage. If the digital low is 0V (which is usually the case) then the average voltage can be calculated by taking the digital high voltage multiplied by the duty cycle, or 5V×0.6=3V. Selecting a duty cycle of 80% would yield 4V, 20% would yield 1V, and so on.

In addition to controlling a current set point for the plasma arc, which sets the intended current of the plasma arc, the actual current of the plasma arc can be monitored. For example, the current at an electrical connection between the plasma arc and the pulse width modulation control system 508. This electrical connection is marked in FIG. 5 as current measurement point 510. As one skilled in the art would readily understand, voltage can also be measured where the current is measured.

As discussed below, electrical characteristics can be measured and monitored at various points throughout the system to predict or otherwise estimate changes (e.g., physical or mechanical changes) in a plasma arc process being implemented. For example, fluctuations in plasma arc voltage or in the pulse width modulator duty cycle supplying the plasma arc can indicate a lengthening of the plasma arc. Additionally, plasma arc current can be monitored (e.g., at the current measurement point 510) and compared to a current point, by which consumable failure can be predicted by noise levels between the set point and the actual current.

Figure 13:
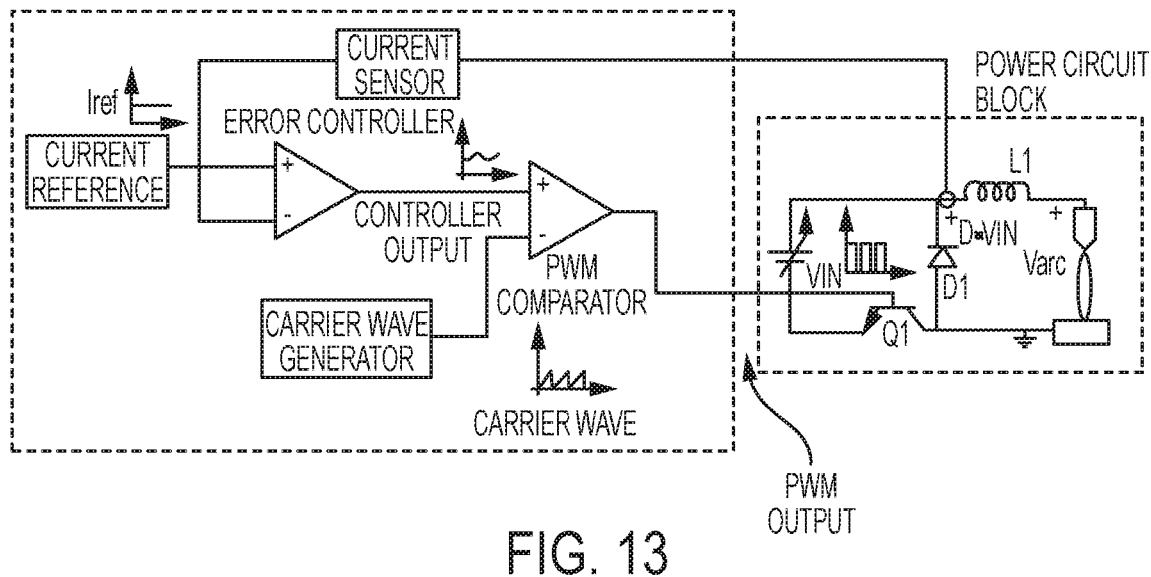
FIG. 13 is a schematic depicting an example pulse width modulation current control circuit, for example, as used in the HD 4070 Plasma Cutting System by Hypertherm.

Additionally, in some embodiments, pulse width modulation (PWM) current control in a power supply can implemented using a hybrid combination of DSP and op-amp based circuits. For example, first, the building blocks that include a PWM Current Control circuit (e.g., the HD 4070 Plasma Cutting System from Hypertherm) are described in FIG. 13. This description is then followed with a description of the HPR PWM Current Control circuit in FIG. 14. The use of a DSP in the HPR control circuit facilitates easy estimation of the arc voltage. In addition to strictly using arc voltage, as described herein, the PWM duty cycle can also be calculated and used to implement the various methods herein. For example, FIG. 13 shows the schematic of an example plasma cutting power supply control system, which includes an analog op-amp based PWM current control circuit and its associated power circuit block. The building blocks of the PWM control circuit can include:

1) An error controller block (e.g., Proportional-Integral-Derivative or PID) that monitors the power supply current and produces an error output after comparison with a desired current reference;
2) A PWM comparator block that compares a modulating signal (in this case the error controller output) with a carrier wave signal. The latter is generally a saw-tooth or triangular waveform with its frequency ranging anywhere between 100's of Hz to MHz depending on the application. In a plasma cutting application, this frequency is typically around 15 kHz. The comparator amplifies the difference between the two signals and produces an output whose average value over one switching (carrier wave) cycle is equal to the value of the modulating wave at the instant of comparison; and
3) A feedback current sensor block (e.g., Hall current sensor) that monitors the power supply output current and feeds it back to the controller.

The plasma cutting power circuit block can include an unregulated dc input voltage source $V_{in}$, a power transistor switch-diode combination ($Q_1$-$D_1$), an output filter inductor ($L_1$) and the arc load. The PWM comparator output controls $Q_1$ state (ON or OFF) to fulfill the control objective of achieving and maintaining the desired output current.

Figure 14:
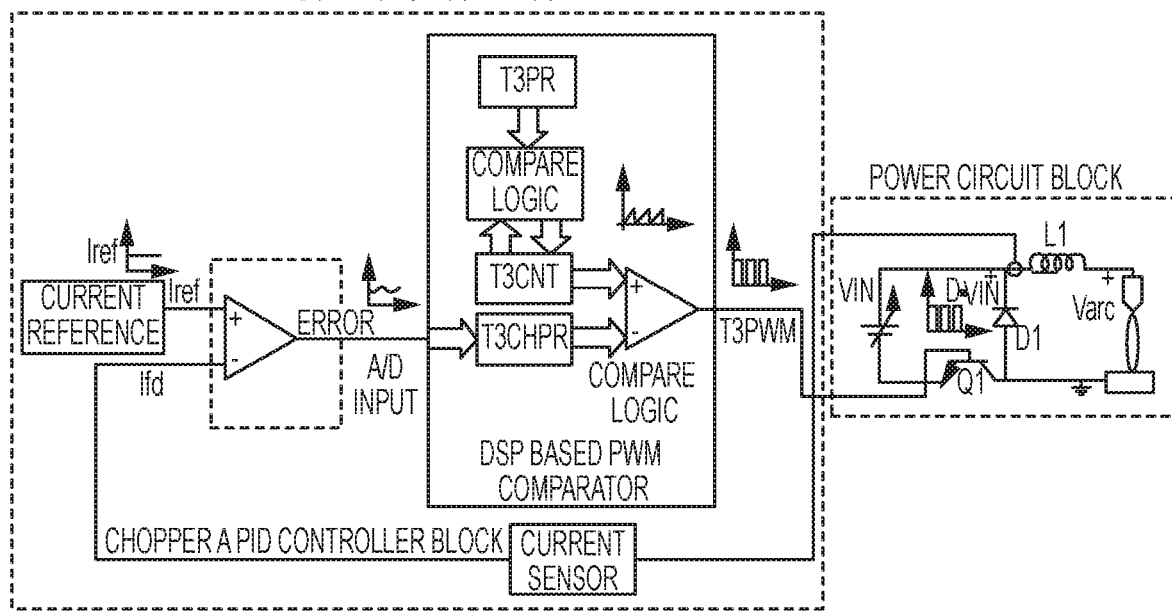
FIG. 14 is a schematic depicting another example pulse width modulation current control circuit, for example, as used in the HPR Plasma Cutting System by Hypertherm.

In another example, as depicted in FIG. 14, which is a block diagram of a Hybrid Plasma Cutting Power Supply Control System (e.g., HPR 130 Power Supply by Hypertherm). In this example, the PWM comparator block can be realized using a DSP (TI LF 2407). The appropriate peripherals inside the DSP chip are typically configured to produce a triangular carrier wave of 15 kHz frequency. An op-amp based PID error controller output can be sensed through the DSP A/D converter interface. The PWM signal comparator then compares these signals and generates a PWM pulse train at its output. This signal is then used to turn-on and off the HPR chopper IGBT controlling the output current in the process.

Using these and other power supply designs, the arc voltage can be calculated in several ways. For example, in some embodiments, methods to estimate arc voltage can be based on the principle that inductor voltage drop is substantially zero at constant arc current. This implies that the average dc voltage at the input of the inductor is equal to the average value of the arc voltage. For example:

$$V_{arc}=D_{ss}*V_{in} \qquad \text{Eq. (1)}$$

Where,
$D_{ss}$—steady state duty cycle of the transistor switch
$V_{in}$—unregulated dc input voltage
$V_{arc}$—average arc voltage component In the case of the HPR control circuit both of these parameters (i.e. $D_{ss}$ and $V_{in}$) are readily available for arc voltage computation. The current controller output whose value is stored by the DSP in the T3CMPR (Timer compare register) is the duty cycle value $D_{ss}$. The DSP can also monitor the input ac voltage $V_{acin}$ to provide input ac under and over-voltage protection to the system. This parameter can be used to obtain $V_{in}$ since the two ($V_{in}$ and $V_{acin}$) are directly proportional to each other. With both of these parameters available, Eq. (1) can be easily implemented in the DSP with very little computational overhead for $V_{arc}$ estimation.

This type of arc voltage estimation can have several advantages. First, for example, the arc voltage estimation implementation does not require additional hardware and requires very little software and computational overhead. Also, the estimated $V_{arc}$ value can be transmitted to a Torch Height Controller, which can set the standoff height of the torch from the workpiece, through a serial cable already linking the two (i.e., power supply with the THC). In the process, the voltage divider board currently used for arc voltage measurement as well as cables connecting this board to the power supply and the Torch Command Module (TCM) can be eliminated reducing associated board and wiring costs. Additionally, arc voltage measurements using the voltage divider board can be susceptible to electrical noise even though the divider board provides a galvanically isolated measure of the arc voltage. Whereas, the arc voltage estimation herein reduces (e.g., eliminates) this problem and its associated servicing costs.

The above electrical and fluid management systems can be used to implement various methods to implement or improve a material processing operation, such as a cutting or gouging operation.

Consumable Protection Methods

Developments in the electrical systems described herein, such as plasma arc power supply systems, have increased the ability to quickly monitor various electrical signals indicative of a physical state of the plasma arc (and thus also of an impending arc failure event) and also the ability to respond quickly to generate an electrical arc ramp procedure. That is, electrical characteristics observed during a material processing operation, such as a cutting, gouging, or other material altering operation, can be used to infer various issues encountered during the operation and, based on the characteristics, the plasma arc system can implement various responsive actions to maintain the processing operation or to limit undesired damage to system components, such as consumables of the plasma torch.

For example, the systems and methods described herein can be used to reduce plasma torch ramp-down errors. Plasma cutting electrode life can be significantly reduced when subjected to ramp-down errors. A ramp-down error (RDE) can occur when the plasma system experiences a sudden loss of the plasma arc and is unable to complete the coordinated ramp-down of plasma gas plenum pressure and cutting current (which in some cases is referred to as "Long Life Technology"). The sudden loss of the arc can cause increased hafnium wear, especially in the presence of oxygen. For example, in some cases, without a proper arc extinguishing sequence, when plasma arc is immediately lost, the high pressure of the plasma gas continuing to flow can blow away molten emitter material, which can lead to the wear. Also, in some cases, the arc snapping out can generate turbulent flows within the torch, also resulting in material loss. In some cases, a ramp-down error RDE rate of 20% can result in electrode life reductions of 50% or more. Thus, the systems and methods described herein can be used to reduce plasma torch ramp-down errors.

The concepts described herein can enable a plasma system to detect the early stages of ramp-down error, for example, by monitoring an electrical characteristic, such as the estimated arc voltage, changes in estimated arc voltage, a characteristic of the pulse width modulation control system (e.g., duty cycle or rate of change of duty cycle), and then initiate a rapid ramp-down. For example, in some cases, the rapid ramp-down can include a rapid current and/or gas ramp down. Alternatively or additionally, the ramp-down can include stopping a motion of the torch using the torch controller (e.g., a CNC). The detection and subsequent ramp-down will typically occur before the power supply reaches its maximum voltage capability (e.g., the point at which the plasma arc is lost), limiting or preventing ramp-down error by adjusting a number of system parameters to tailor a ramp down profile for the specific event.

Arc Voltage Behavior Before Ramp-Down Error

When the plasma torch travels beyond the edge of the material, the plasma arc stretches (e.g., as the distance between the torch and the edge of the workpiece increases (e.g., the arc attachment point where the plasma arc attaches to the workpiece)) and causes the arc voltage to increase rapidly. Along with the arc voltage, the pulse width modulation duty cycle would also increase as the chopper controller adjusts the pulse width modulator to maintain a desired current. Typically, this would occur at either the external edge of the material or on the edge of a large internal feature ((e.g., a kerf, a hole, a gap, etc.) (large enough such that the arc cannot "jump" the gap)). While the pulse width modulation duty cycle and arc voltage are expected to vary slightly during steady-state cutting, a stretched arc will cause them to abruptly and significantly increase.

Detecting an Impending Ramp-Down Error

Figure 6:
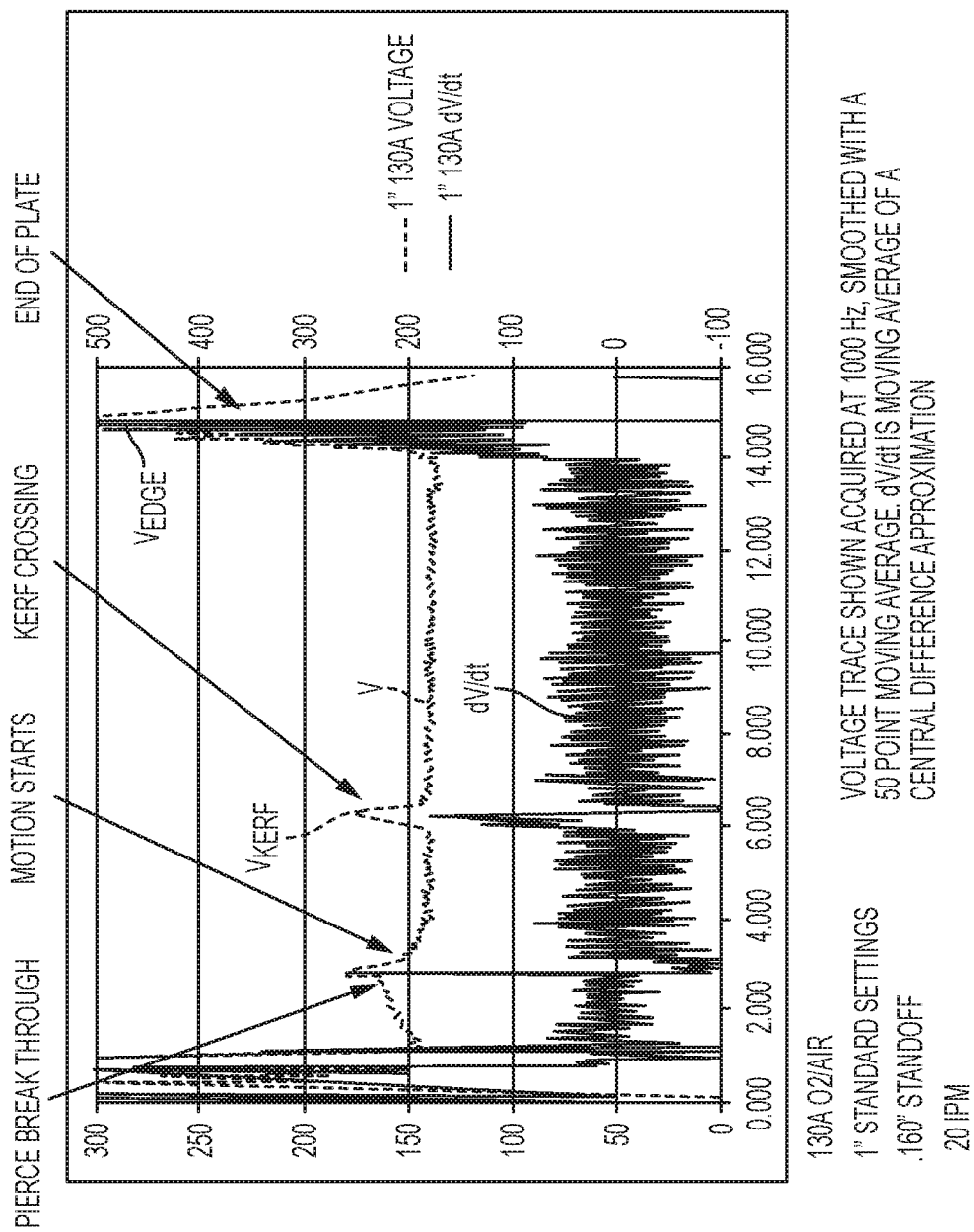
FIG. 6 is a schematic depicting plasma arc voltage and a rate of change of the voltage during an example cutting sequence, illustrating how voltage reacts to physical changes affecting the cutting sequence.

The arc voltage may be monitored directly or calculated using the BUSS voltage and PWM duty cycle of the current control system. Lower action limits can be used to filter normal voltage fluctuations due to material imperfections, a warped plate, arc dynamics, etc. Action limits may also be imposed to filter out kerf-crossing voltage changes. In FIG. 6, the relationship between $V_{kerf}$ and $V_{edge}$, V, and dV/dt may all potentially indicate unique characteristics at an edge and may be used to differentiate between a recoverable kerf crossing and an unrecoverable edge. Additionally or alternatively, as mentioned above, the pulse width modulation duty cycle maintaining a desired current level for the plasma arc can also indicate the unique characteristics at the edge. The example of FIG. 6 depicts the behavior of a 130 A oxygen/air process at 20 inches per minute (ipm). This is a very slow cutting speed and the voltage trace is similar to the predicted behavior. This test also shows the pierce event (i.e., where the voltage and rate of change of voltage spikes), which would typically need to be accounted for by adjusting the arc voltage action limit, for example, to limit or avoid false ramp-down estimation. While similar behavior is expected for other cutting scenarios, as the cutting speed increases, dV/dt also typically increases, resulting in less time for ramp-down. As a result, filtering kerf crossings (i.e., to avoid false ramp-downs if it is not desired by the operator to ramp down when crossing a kerf) may be more challenging as speed increases.

Figure 7:
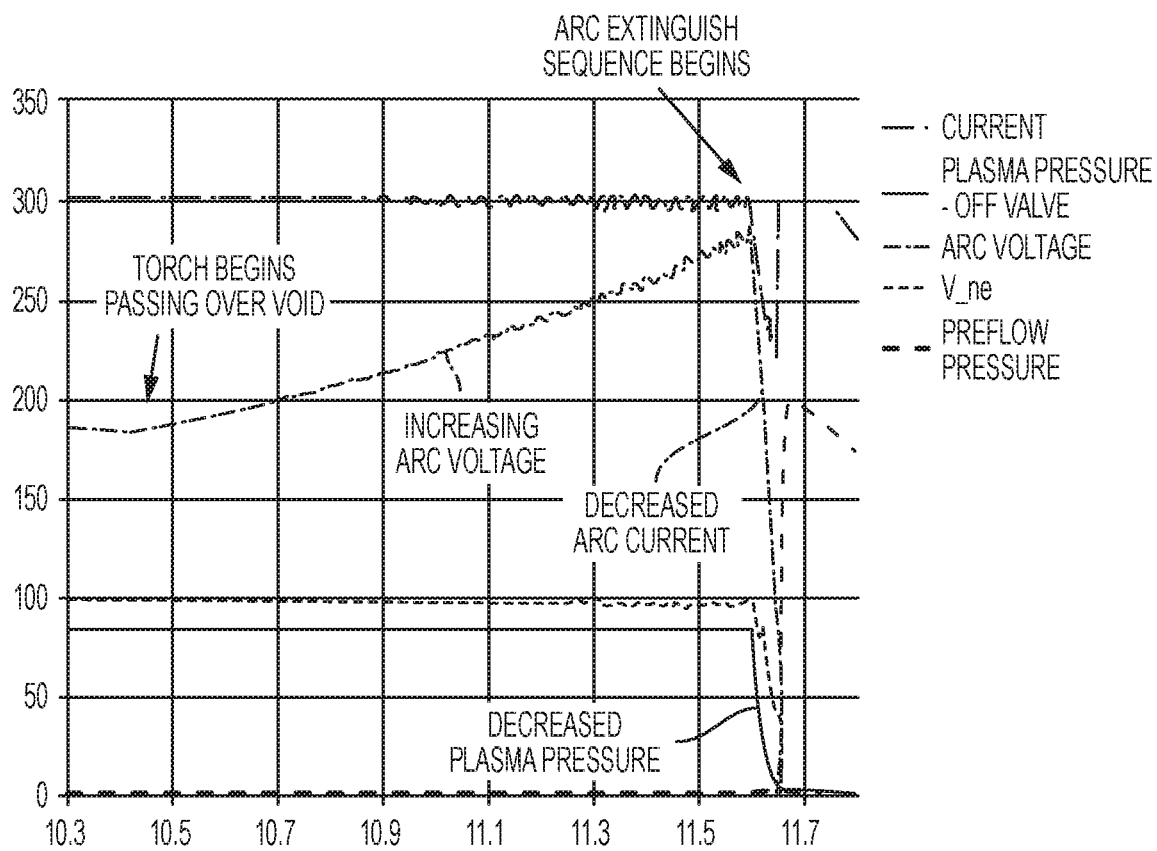
FIG. 7 is a schematic of an example sequence for predicting an impending plasma arc failure and implementing an arc extinguishing sequence prior to failure.

Therefore, referring to FIG. 7, electrical characteristics can be monitored to predict when a plasma arc is about to be inadvertently extinguished (e.g., in the absence of a planned arc extinguishing sequence) and implement a substitute (e.g., accelerated) arc shut down. The characteristic and changes thereof can suggest physical changes that happen during the processing operation. Specifically, fluctuations in the electrical characteristics of the plasma arc can suggest physical changes in the plasma arc, such as a lengthening of the arc. In some cases, such lengthening of the arc can suggest that the plasma torch has gone, or is about to go, over a void in the workpiece. For example, the void can include running off an edge (e.g., an outer peripheral edge) of a workpiece or running over a kerf. For example, in some aspects, methods, such as methods for limiting plasma arc blowout (e.g., or snap out) or for preserving a usable life of a plasma arc electrode consumable installed in a plasma arc torch can first include measuring (e.g., continuously, instantaneously, or in real time measuring) a characteristic of an electrical signal being provided to the torch to generate a plasma arc between the torch and a workpiece to be processed. That is, as the plasma torch begins to leave the workpiece and move towards the void, the measured characteristic, or a change thereof, can indicate an increasing distance between the plasma arc torch and the arc attachment point where the plasma arc attaches to the workpiece. For example, the characteristic typically includes a characteristic of a pulse width modulation system (e.g., the pulse width modulation control system 508). In some cases, the characteristic can include a duty cycle of the pulse width modulation control system. That is, the pulse width modulation duty cycle would also increase as the chopper controller adjusts the pulse width modulator to maintain a desired current as the arc gets longer. Alternatively or additionally, the characteristic can include a rate of change of the duty cycle of the pulse width modulation control system. The duty cycle of the pulse width modulation control system can also suggest or indicate an amount of electrical force being used to maintain a consistent (e.g., constant) plasma arc current. In effect, the duty cycle can show the level of effort needed to control a consistent plasma arc current. That is, using the electrical system designs described herein, this monitoring and control of the system and physical state of the arc can be performed in the power supply itself, which allows for faster detection and response accordingly and does not need to rely on the controller for this information). Similarly, performance with the workpiece can be monitored in near real time and via the communication systems and the improved gas control system, alternative ramp-down approaches can be implemented to lengthen life. In other prior conventional systems, the controller has typically been used to monitor torch performance and make adjustments accordingly. As a result, reaction times using the systems and methods herein can be faster, and thus more protective of torch components, than prior conventional systems.

In some embodiments, the characteristic can include a voltage of the plasma arc. For example, the plasma arc voltage can be estimated (or detected) in accordance with the systems and methods illustrated and described above with respect to FIGS. 4 and 5.

These methods typically also include monitoring the characteristic during operation of the torch over a time period and comparing the characteristic to a threshold value. For example the time period over which the characteristic is monitored can include a material processing time period (e.g., time to complete a cutting or gouge operation) or a predetermined time period. As mentioned above, the characteristic can correlate to a physical observation of the plasma arc and threshold values can be used to estimate certain physical criteria of the plasma arc. For example, certain values of pulse width modulation duty cycles, plasma arc voltages, or rates of change thereof can suggest that a plasma arc has reached a certain (e.g., undesirable) length. Thus, it can be useful to determine such threshold values (e.g., empirically) to be able to predict characteristics of the arc itself.

In some examples, the threshold value can be predefined for a particular cutting process or material. That is, the threshold can vary between different types of workpiece materials and/or thicknesses, different cutting speeds, or different cutting operations (e.g., fine cutting, rough cutting, gouging, etc.). In some cases, the plasma arc system (e.g., the power supply) can reference a lookup table based on the programmed cutting operation to determine the desired threshold to be considered. For example, threshold pulse width modulation duty cycle values can be greater than about 70% (e.g., greater than or equal to about 71%, 72%, 73%, 74%, 75%, 76%, 77%, 78%, 79%), greater than about 80% (e.g., greater than or equal to about 85%), greater than about 90%, or greater than about 95%.

Based on the comparison of the characteristic to the threshold, the plasma arc system can implement various adjustments to the material processing operation. For example, in some embodiments, in response to determining that a measured characteristic meets (e.g., and/or exceeds) the threshold value, the plasma arc system can initiate an arc extinguishing sequence. In some cases, the arc extinguishing sequence (e.g., also referred to as a plasma arc shut down sequence) can preserve or protect the life of the electrode prior to a failure of the electrode. That is, the system can, based on the measured characteristic, predict when an undesired or inadvertent arc failure or other system shut down is about to occur and implement an accelerated (e.g., emergency or rapid) shut down sequence. For example, the gas pressure and current can be decreased rapidly to a level that will reduce (e.g., minimize) hafnium erosion of the electrode emitter. In some embodiments, this can result in improved electrode life by reducing the amount of hafnium ejected (blown off) as a result of arc snap outs, blow outs, or extinguishment. Similar to the standard ramp-down process, low plasma plenum gas pressure is typically desired to reduce (e.g., minimize) hafnium erosion. This can be particularly useful because inadvertent arc shut down can cause damage to the torch consumables (e.g., degradation of the electrode), so if the system predicts that the arc is about to be shut down, for example because the torch is going to go off the edge of the workpiece, it can implement a shortened or accelerated shut down procedure. In some embodiments, the arc extinguishing sequence can include decreasing a plenum gas pressure so that the plasma arc is extinguished in a lower pressure environment. For example, in some cases, the plenum gas pressure can be decreased to about 7 psi to about 3 psi. The pressure can be decreased quickly in any of various ways. For example, concepts to reduce the time to reduce plasma gas pressure can include using additional exhaust paths (vents) near the torch or reducing one or more supply gas lines to atmospheric pressure while cutting and allowing the plasma plenum to exhaust into the lower-pressure supply gas line.

As previously mentioned, conventional electrode life can be reduced by 50-70% when subjected to a ramp-down error rate of 20%. Some conventional designs and some new concepts exhibit this vulnerability. If ramp-down error is minimized or prevented, the electrode life will be much more consistent and predictable Additionally or alternatively, in some embodiments the arc extinguishing sequence can include decreasing a plasma arc current so that the plasma arc is extinguished in a lower current environment. In some embodiments, the plasma arc current can be decreased to a value of about 90 amps to about 22 amps. In some examples (e.g., high current examples), the current is decreased from about 300 amps down to about 90 amps. In some examples (e.g., low current examples), the current can be increased from about 30 amps to about 22 amps. In some examples, the current can decrease by about 25% to by about 70%. In some cases, the plasma arc current can be decreased to near zero well within the expected 100 ms timeframe.

As described above, the arc extinguishing sequence can be implemented to quickly extinguish the plasma arc but in a controlled manner. The amount of time over which the shut down sequence can take place can vary. For example, the lower action limit, signal delay, torch travel speed, maximum sustainable arc voltage, and gas valve delay typically determine the amount of time available for ramp-down. In some embodiments, the arc extinguishing sequence can be completed in less than about 70 milliseconds (e.g., less than about 60 milliseconds (e.g., less than about 10 milliseconds)). For example, in a 300 amp cutting process, the arc extinguishing sequence can be completed in less than about 60 milliseconds. In another example, in a 30 amp cutting process, the arc extinguishing sequence can be completed in less than about 10 milliseconds. In one example, for a predicted maximum voltage of about 300V, a cutting speed of 20 ipm to 230 ipm, and a CAN signal delay of 10 ms, the predicted time available for ramp-down can range from about 100 ms to about 1000 ms.

Other methods for operating a plasma arc torch can implement one or more of the above concepts for extinguishing a plasma arc during a material processing (e.g., cutting or gouging) operation to limit or reduce electrode wear resulting from unintended arc loss.

Such methods can include initiating the plasma arc between an electrode of the plasma arc torch and a workpiece to be processed with the torch (or transferring a plasma arc from a nozzle to the workpiece) and translating the torch along the workpiece and performing a processing operation to the workpiece. For example, the plasma arc can be initiated to begin piercing or cutting/gouging and the torch can be moved to form the cut or gouge in the workpiece.

The torch can be advanced or otherwise moved along the workpiece and towards a void defined by the workpiece. As mentioned above, this can include moving the torch during a material processing operation towards an edge of the workpiece (e.g., an outer peripheral edge) or a kerf formed by a prior processing operation. In some cases, the torch may be moved towards the void (e.g., an edge or kerf) intentionally due to the desired processing operation. Alternatively, in some cases, the torch may be moved towards the void inadvertently, for example, because the workpiece is not sized properly or is mispositioned on a plasma arc system (e.g., a cutting table). In some cases, the plasma arc system may be directing the torch along the workpiece and undesirably reach an unexpected edge of the workpiece.

As discussed above, as the torch reaches or goes off of the void, the plasma arc can increase in length between the torch and the arc attachment point at which the arc connects from the electrode to the workpiece. Thus, responsive to the torch reaching the void, the method can include detecting a lengthening of the plasma arc between the arc attachment point and the torch. In some embodiments, the detecting the lengthening of the plasma arc comprises monitoring a characteristic of an electrical signal being provided to the torch to generate the plasma arc and comparing the characteristic to a threshold value. As mentioned above, the characteristic can include any of various electrical criteria associated with the plasma arc. For example, the characteristic can include a bus voltage of the plasma arc system. In some cases, the bus voltage can be compared to an incoming voltage to determine a duty cycle percentage of at least one of a chopper or a pulse width modulator. These plasma arc estimation and pulse width modulation duty cycle calculations are described above in detail. The characteristic can include a pulse width modulation value, such as duty cycle. For example, in some examples, the chopper output can be determined. The chopper can have an open circuit voltage and during operation the current can be measured and if the current is too low, the pulse width modulation duty cycle can be increased. This sampling and adjustment can be performed periodically (e.g., every 33 microseconds) to adjust the pulse width modulation duty cycle. This adjustment can be viewed as a control loop, and the adjusted pulse width modulation duty cycle can be compared at each loop to the threshold value. The characteristic can also include a rate of change of an electrical measurement, such as a rate of change of the pulse width modulation duty cycle or a rate of change of a plasma arc voltage. In some cases, using the rate of change can be useful as a way of filtering, removing false positives, or otherwise looking passed temporary spikes or fluctuations that may not necessarily indicate such the lengthening of the plasma arc. Based on the detected plasma arc lengthening, the plasma arc system can initiate an arc extinguishing sequence, which can provide a more desirable environment to extinguish the plasma arc and limit wear of the electrode.

Unless otherwise stated, various features and embodiments of these methods can be combined with one another or with the other aspects described herein.

Torch Protection Methods

Figure 8:
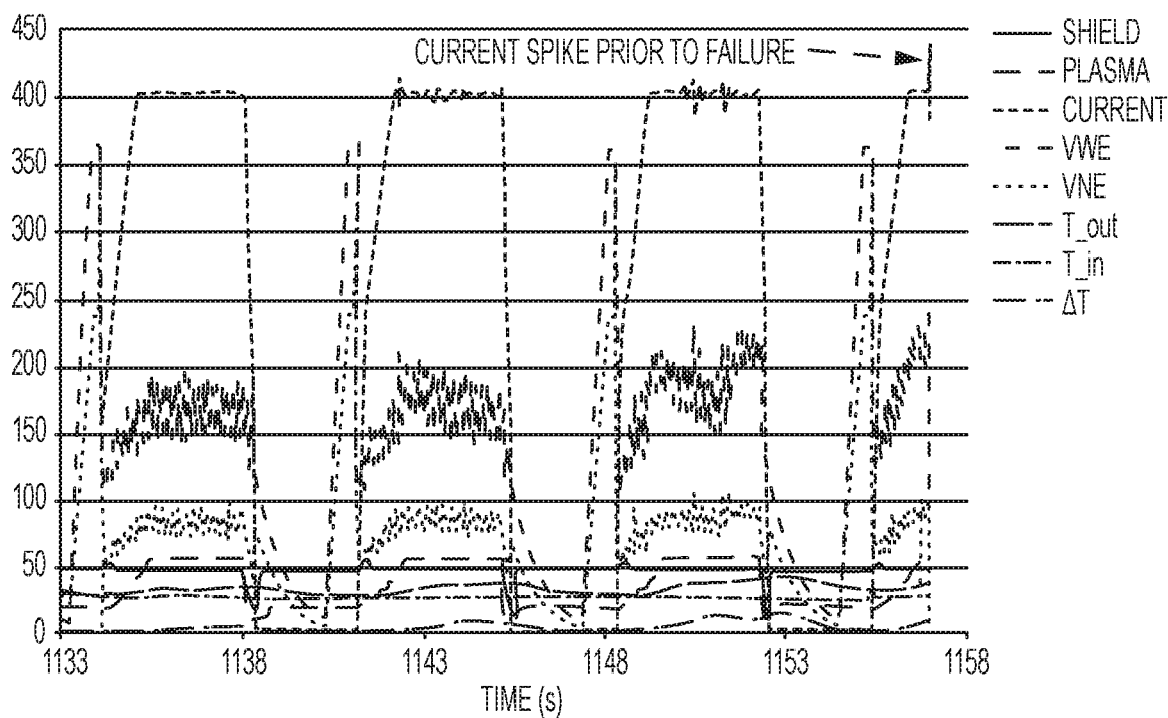
FIG. 8 is a schematic of an example sequence for predicting an impending consumable blow out in a plasma arc torch based on fluctuations in plasma arc current.

Electrical measurements relating to the plasma arc or other observed electrical signals within a plasma arc power supply relating to the plasma arc can also be used as a way to monitor for consumable degradation or failure and protect a torch body. That is, in some cases, as a consumable installed within a torch body begins to fail and completely blows out (e.g., damage can occur through arcing damage or in molten copper/materials which gets into the cooling passages of the torch), the torch body can also be damaged due to the high heat and fluid loss from the consumables. However, referring to FIG. 8, utilizing some of the torch monitoring and control systems described above, torch operation can be monitored in order to detect or predict an impending torch failure and end the torch operation to limit or prevent damage to the torch.

For example, in some aspects, methods for limiting damage to a plasma arc torch body resulting from a detected of an impending consumable failure within the torch can include determining a specified conductivity parameter (e.g., current or voltage) set point of a current to be provided to the plasma arc torch for a material processing operation. For example, with regards to the embodiments described above and illustrated in FIGS. 4 and 5, a pulse width modulation control system 508 can be used to set a desired plasma arc current set point. The current set point can vary based on various limitations, such as the desired cutting process (e.g., fine cutting, gouging, etc.), desired cutting speed, material to be processed, etc.

Next, a conductivity parameter of plasma arc current being provided to the plasma torch to perform the material processing operation can be measured. That is, while setting the desired plasma arc current or voltage, the system can also measure or otherwise determine the actual current or voltage of the plasma arc. In some embodiments, this includes measuring deviations in the conductivity parameter over a number of n samples and then summing them together. When the sum of n exceeds the thresholds, it trigger a warning and/or shut down the system. In some cases, this can be a magnitude difference of difference (e.g., an error value of 100 for lower amp processes and an error value of 150 for 300 amp processes). Whereas, normal operating conditions can tend to generate only single digit error values. For example, the conductivity parameter can be measured at an electrical connection between the plasma arc and the pulse width modulation control system 508. This example electrical connection is marked in FIG. 5 as current measurement point 510.

Then, the specified conductivity parameter set point can be compared to the detected conductivity parameter of plasma arc current. In some examples, a difference between the set point conductivity parameter and the actual detected conductivity is calculated. In some embodiments, the difference can be used to calculate an error term signal (e.g., also referred to as a deviation) that indicates how much the actual conductivity parameter deviates from its intended value. In some cases, this determines errors or fluctuations in plasma arc current. The error term signal can include a compilation of multiple comparisons of the specified current set point to the detected plasma arc current at multiple times during a material processing operation/over a given period of time. The multiple times can be performed over a predetermined time interval. The multiple comparisons can be a rolling sum of multiple error term signals detected over consecutive plasma arc current measurements. In some cases, the multiple error term signals can be about 5 error term signals to about 20 error term signals.

The error term signal can be compared to a threshold amount. For example, the system can reference a lookup table of example error term signal threshold amounts. In some examples, the threshold value can be predefined for a particular cutting process or material. That is, the threshold can vary between different types of workpiece materials and/or thicknesses, different cutting speeds, or different cutting operations (e.g., fine cutting, rough cutting, gouging, etc.). Based on a determination that the error term signal exceeds the threshold amount, a plasma arc shut down sequence can be initiated to extinguish the plasma arc to limit damage to the plasma arc torch body. That is, as discussed above, an increasing error term can indicate or suggest a physical degradation of the consumable in the plasma torch. Therefore, failing consumables in a torch body, which can cause fluid to expel within the torch body, can create unwanted noise in the plasma arc electrical signals, which results in the error term unintentionally increasing. The plasma shut down sequence can be implemented to shut down the torch before incurring further consumable failure which could damage the torch body. In some embodiments, the plasma shut down sequence can include decreasing a plenum gas pressure so that the plasma arc is extinguished in a lower pressure environment. In this aspect, the system typically need not shut down the torch in a controlled manner to protect the consumable for future use as with the ramp-down aspects described above due to the degradation of the consumables. That is, the torch protection methods here are typically implemented to determine that a consumable or a set of consumables are failing, and thus are beyond a point from which further use is possible. Thus, the plasma shut down sequence can include an abrupt, immediate shut down of the torch. In some embodiments, the shut down of the torch can include decreasing the plasma arc current and shutting down the pump. In some embodiments, the shut down of the pump can include forcing a system reset and replacement of the consumables. That is, since the system has determined that the consumables have failed or are about to fail, the system can go into a lock mode in which the system is essentially inoperable until the failed consumables are replaced. In some cases, this limits or prevents a user from attempting to further use the torch with the failing consumables, which can lead to damaging the torch. This can be useful to protect the torch by limiting or preventing a total electrode blow out.

Other example methods are possible to implement one or more of the above torch protection features. For example, some methods of operating a plasma arc torch can include initiating a plasma arc in the plasma arc torch and sending a signal to operate the plasma arc at a defined operating current and detecting an actual current level of the plasma arc. As described above, the current level of the plasma arc can be measured, for example, at an electrical connection between the plasma arc and the pulse width modulation control system 508. This example electrical connection is marked in FIG. 5 as current measurement point 510.

Next a deviation between the defined operating current and the actual current level can be determined and, in response to determining that the deviation is below a threshold error level, permitting the plasma torch to continue operating. That is, the system can be configured to substantially continuously monitor the plasma arc current on a rolling basis and, as long as the measured current is within particular deviation range of the current set point, permit the system to operate. The current can be detected and redetected after one or more sample cycle time periods, and the updated deviation between the defined operating current and the redetected actual current level can be determined. For example, the plasma arc current can be measured and compared for a second, third, fourth, etc. time. In some cases, the deviations can include a rolling sum of the previous 5 to 20 measurements (e.g., about ten measurements). In some embodiments, the actual current can be compared to the set current. The difference between the actual and set current can be integrated over a time period and compared to a threshold value. In some examples, this comparison can be performed every 330 microseconds.

However, once it is determined that the updated deviation meets or exceeds the threshold error level, a plasma arc extinguishing sequence can be initiated to extinguish the plasma arc to limit damage to the plasma torch body. As discussed above, the comparison of the deviations to a threshold error levels can include referencing a lookup table of threshold values that correspond to one or more material processing scenarios. The plasma arc extinguishing sequence can be implemented to quickly shut down the plasma torch and, in some cases, lock the torch from further use until the damaged consumables are replaced.

In some aspects, the temperature of liquid coolant through the torch can be used to predict consumable failure, either alone or in combination with the failure prediction described above that uses plasma arc current. For example, in some embodiments, fluctuations (e.g., rises) in coolant temperatures (e.g., electrode coolant temperature) can be suggestive of an impending failure event (e.g., a prediction of an end of life event). Therefore, if the coolant temperature can be monitored for such fluctuations, the end of life event can be predicted. In some cases, use of coolant temperature can be used as a general warning that a failure may be approaching. This can be viewed as a "yellow" caution light to put the user on notice. Whereas the current monitoring above can be more of a determinative notice that a failure is impending. This can be viewed as a "red" stop light in which the power supply can take action to stop the torch operation. This can be useful to provide an individualized end of life prediction for each electrode used in a torch, and typically does not require consideration of cutting errors, marking starts, ramp-down errors, cutting processes, etc. These methods also help to limit or prevent electrode blowout. In addition to protecting an electrode, the methods can also reduce torch damage and warranty returns, as well as reduce scrap and workpiece failures.

Embodiments of this aspect can include any of various features. For example, the system can use temperature probes to monitor coolant flow to and/or from an electrode during torch operation. The system can include two temperature probes to monitor, for example, two different time scenarios (e.g., an on and an off temperature) or two places (e.g., flow temperatures before and after the electrode). In some embodiments, the temperature rise across the probes can be monitored over a period of time to generate a temperature profile, which can be used to predict a catastrophic failure. Additionally, the power input to the electrode can be monitored. Spikes or significant fluctuations (e.g., significant rises) in the electrode temperature can indicate upcoming failure. For example, in some cases, the temperature profile can be compared to a threshold profile to determine an upcoming failure.

Unless otherwise stated, various features and embodiments of these methods can be combined with one another or with the other aspects described herein.

Material Workpiece Piercing Detection Methods

In addition to or in alternative to the consumable and torch protection methods described above, the electrical and gas delivery systems described above can be used during a startup sequence of a plasma arc torch. Specifically, the electrical systems described herein to predict (e.g., using the power supply itself) when a workpiece piercing sequence has completed so that the torch can be moved and a material processing operation can begin. By enabling pierce detection, various processing parameters can be adjusted to increase plasma torch performance, life, and efficiency.

For example, in some embodiments, the PWM monitoring and/or arc voltage estimation discussed above can be used to detect when the plasma arc has successfully pierced the workpiece and to begin motion of the plasma torch before arc voltage becomes unsustainable. In some embodiments, arc voltage estimation can be used to lower the total arc voltage required during piercing by providing insights to altering the process parameters (such as, plasma pressure, arc current), or by altering the pierce gas type (e.g., inert gas such as, argon, nitrogen, etc. in the shield gas). Once the pierce has been detected using the PWM monitoring and/or arc voltage estimation, the process parameters can be adjusted to a cutting process (e.g., as opposed to those desired for a pierce process). For example, the arc voltage could be lowered after piercing (breakthrough) is detected.

Figure 11:
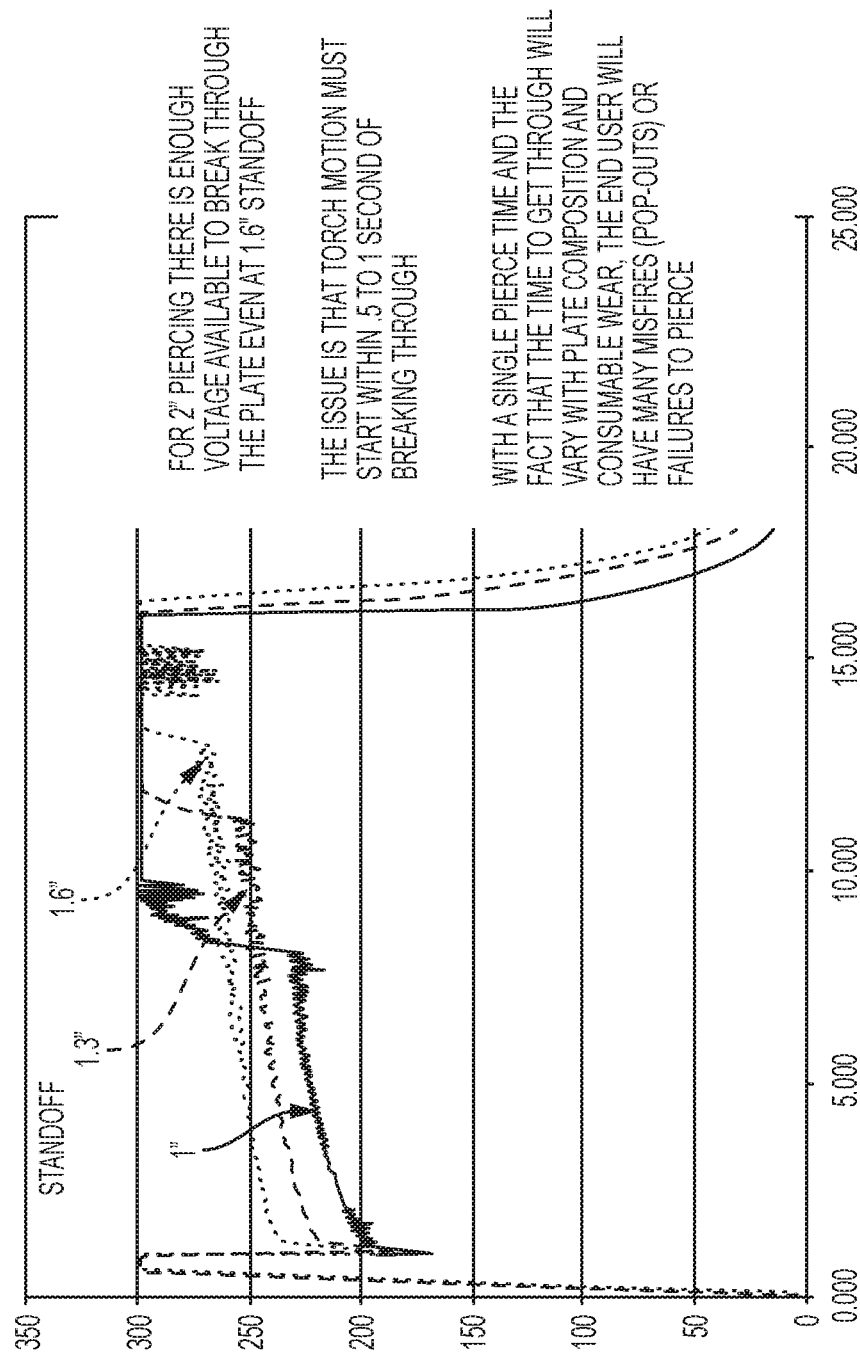
FIG. 11 is a schematic of example arc voltages during workpiece piercing, illustrating reduced piercing voltages and shorter piercing time for shorter standoff heights.

This can be particularly useful because, as depicted in FIG. 11, there is typically a tradeoff between standoff distance (e.g., the distance between the torch and the workpiece) and arc voltage as illustrated by pierce traces taken at different torch to workpiece/arc attachment point distances (e.g., 1 inch, 1.3 inches, and 1.6 inches). For 2 inch piercing, there is typically enough voltage available to break through the plate, even at a standoff height of 1.6 inches. One issue with this observation is that the torch typically must start motion within 0.5 seconds to 1 second of breaking through the workpiece. With a single pierce time, and the fact that the time to get through will typically vary with plate composition and consumable wear, the end user may experience undesired or failed start up attempts, such as misfires (pop-outs) or failures to pierce. Note that the voltage when the arc pierces the workpiece is relatively low compared to the maximum voltages seen shortly after breakthrough. The time available for the end user to initiate table motion after breakthrough but before arc extinction is much shorter when using larger standoffs.

Additionally or alternatively, in some cases, parameters, such as gas flows (e.g., shield gas or plasma gas flows) or electrical parameters (e.g., current or voltage) can be adjusted based on the plasma piercing to increase (e.g., maximize) the usable life of the consumable and/or to increase the maximum pierce capacity of the system. For example, the maximum pierce rating of a mechanized system is typically fundamentally limited by either damage to the shield or the maximum voltage available to sustain the arc. These limits are often in conflict. For example, a high torch to work distance can help protect the shield from damage but requires a high (e.g., very high) voltage to keep the arc from extinguishing. In some embodiments, the systems and methods described herein can be used to enable high torch to work distances with lower voltage requirements. For example, certain gases (e.g., non-oxidative plasma or shield gases (e.g., inert gases such as argon gases)) can be selectively delivered to make workpiece piercing easier by requiring less plasma arc voltage. As a result of the reduced plasma arc voltage required to pierce a workpiece, a consumable may be used for more piercing operations than could otherwise be accomplished with conventional gases. Additionally, the reduced voltage required can be useful to increase standoff height during piercing. In some embodiments, the flow of argon gases can be stopped once piercing is detected, for example, using observed changes in the monitored parameters of the electrical system (e.g., in the pulse width modulation system).

Figure 9:
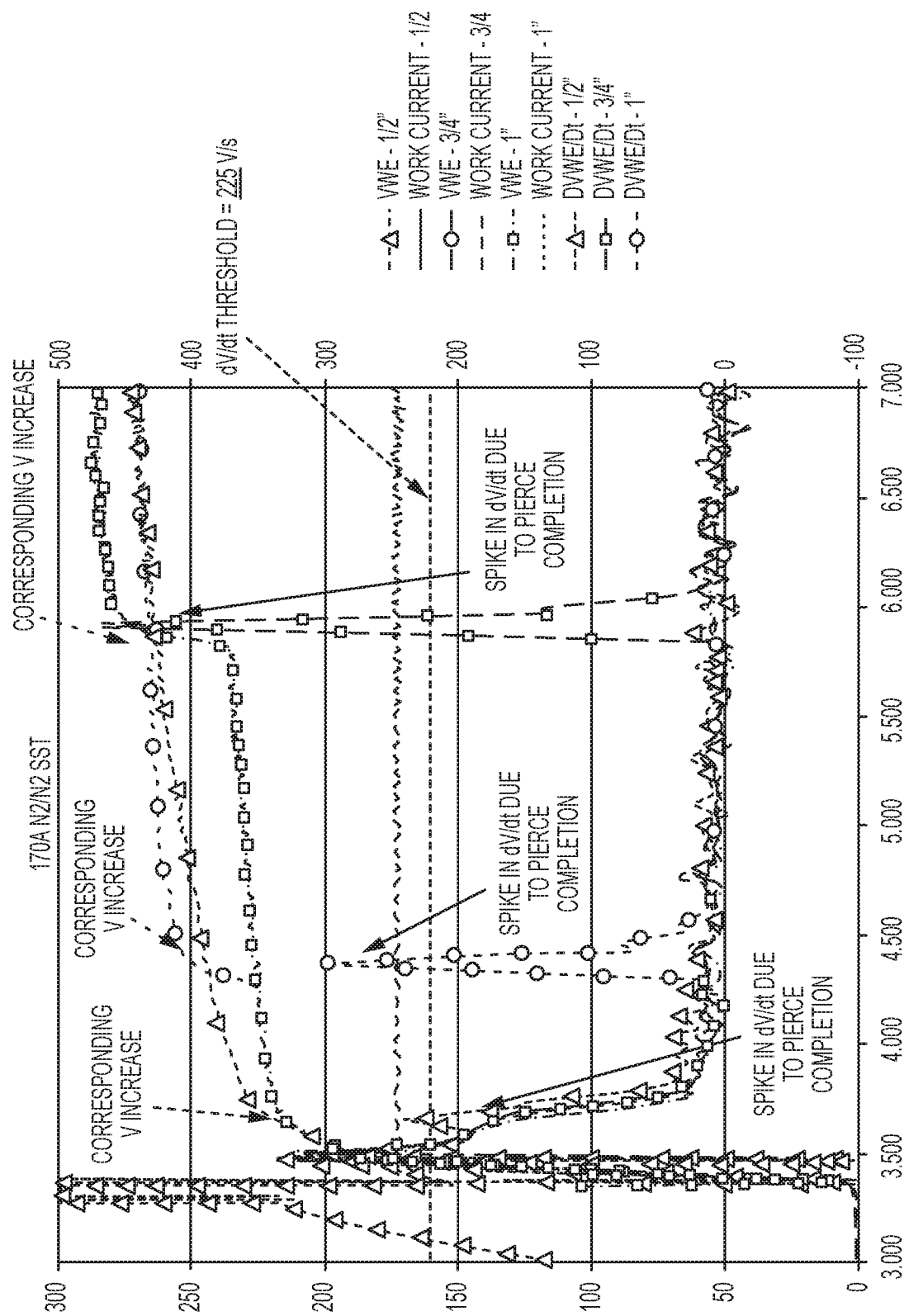
FIG. 9 is a schematic of example sequences for detecting plasma piercing workpieces of different thicknesses by monitoring changes in electrical parameters of the system.

Referring to FIG. 9, electrical parameters can be monitored during a workpiece piercing operation and based on changes to the observed parameters, a plasma system can detect when piercing has been completed. FIG. 9 illustrates three different example observations for different workpiece thicknesses (e.g., ½ inch, ¾ inch, and 1 inch thicknesses).

As depicted, the thicker workpieces typically require greater time to fully pierce through, as reflected by spikes (e.g., rapid increases) in the rate of change of plasma arc voltage. Based on these observations and discoveries, various methods can be carried out for initiating a plasma arc, piercing a workpiece, and performing/transitioning to a cutting operation. Specifically, the time when the arc pierces the workpiece can be detected in a plasma arc signal, such as a pulse width modulation parameter (or rate of change thereof) or a voltage parameter (e.g., rate of voltage change over time (dV/dt)), one or more threshold values, or some combination of both.

For example, in some aspects, methods of starting (e.g., initiating) a plasma arc with a plasma arc torch to pierce a workpiece and detecting the plasma piercing through the workpiece to begin a cutting sequence can include measuring an electrical characteristic of an electrical signal associated with a plasma arc between an electrode of a plasma arc torch and a workpiece to be processed. In some embodiments, the electrical characteristic can include a pulse width modulation characteristic (e.g., duty cycle) or a rate of change of the pulse width modulation characteristic of a signal being sent to generate and maintain the plasma arc. In some cases, the characteristic can include a voltage-based characteristic, such as a rate of change of the voltage. For example, with regards to the embodiments described above and illustrated in FIGS. 4 and 5, a pulse width modulation control system 508 can be used to set a desired current set and, based on the piercing process, the characteristic (e.g., pulse width modulation duty cycle) can vary as the piercing occurs. In some examples, the system can be operated at 15 kHz, which is a time period of 66 microseconds. As discussed above, the pulse width modulation duty cycle is the percent "on" time.

Next, the characteristic can be monitored during operation of the torch over a time period of a workpiece piercing sequence. That is, a plasma arc torch power supply can measure and monitor the characteristic during piercing to determine how the characteristic varies (e.g., how the pulse width modulation duty cycle varies) in reaction to piercing through the workpiece.

The characteristic (e.g., the monitored pulse width modulation duty cycle) can then be compared to a threshold value. In some cases, the threshold value can be a predetermined value that suggests that the plasma has pierced (e.g., broken through) the workpiece. That is, the monitored pulse width modulation duty cycle can increase during piercing and particularly spike (quickly increase) when the plasma breaks through the workpiece. The threshold can vary based on various limitations, such as the desired cutting process (e.g., fine cutting, gouging, etc.), desired cutting speed, material to be processed, etc. Thus, a plasma system can be programmed with multiple threshold values, where each corresponds to a particular cutting process. In some cases, the threshold values can be determined empirically. In some cases, the threshold values can be stored in a lookup table.

In response to, or otherwise based on, determining that a measured characteristic meets and/or exceeds the threshold value, the plasma system (e.g., the power supply) can begin the cutting sequence and cause the plasma arc torch to move relative to the workpiece to form the cut. That is, when the measured characteristic meets or exceeds the threshold value, the system is effectively determining that the plasma has pierced the workpiece. Once piercing is detected, the power supply can initiate movement of the torch to form a cut along its path of motion. In some examples, this can include sending a signal, from the power supply to a gantry controller (e.g., a CNC controller), to cause relative motion between the torch and the workpiece. Detecting piercing and initiating motion in this manner can be beneficial compared to some conventional systems that are based simply on piercing time in that the power supply can actively track the piercing and begin the cutting motion specifically on the pierce completion. In some cases, this can result in faster cutting processes. In some cases, there can be a delay between detecting piercing and beginning the cutting process. For example, when piercing is first detected, it is possible that the plasma has just broken though the workpiece and the hole therethrough is semi-conical or parabolic and holding the piercing plasma in place for some period of time can help to make the hole more substantially cylindrical. In effect, the plasma can be held in place to substantially ream the hole formed by plasma before beginning cutting. In some cases, the time delay can be about 0 milliseconds to about 500 milliseconds.

The ability to detect workpiece piercing using the electrical systems described herein can help reduce or eliminate several issues or drawbacks with conventional workpiece piercing and cutting procedures. For example, conventional techniques typically rely on predetermined piercing time periods before moving to a cutting process (e.g., moving the torch to form a cut). For example, empirical data can be used to determine an estimated time needed to pierce. In some cases, the estimated time can be an estimated worst case scenario for the time required for an electrode with 95% of its usable life gone to fully pierce a workpiece. By way of example, this time period could be about 50 microseconds. However, similar, but new, consumables may only need about 10 microseconds. Thus, these worst case, predetermined time periods have the potential to be far longer than actually needed to pierce the workpiece. That is, in some cases, a plasma can pierce the workpiece and remain in place for an unnecessarily long time before being moved to form a cut. As a result of the excess time in place, the electrode can undergo unnecessary wear, time can be wasted (e.g., because the torch could instead be moved), as well as damage to the workpiece caused by the workpiece being overly worked or heated by the stationary plasma. Therefore, by detecting when the plasma actually breaks through the workpiece, the power supply can take action to begin the cutting sequence, for example, by changing gas flows or beginning torch motion.

In some cases, the gases (e.g., shield or plasma gases) can be changed from a piercing set of gases, to a cutting set of gases. For example, during the piercing sequence, a gas mixture can be delivered having an inert (e.g., argon or nitrogen) gas as a plasma gas and/or a shield gas to surround the plasma. Upon completion of piercing, the gases can be changed to a cutting gas configuration.

Other methods are possible. For example, in some aspects, methods of performing a piercing sequence to pierce a hole in a workpiece with a plasma arc torch can include initiating an arc between the electrode and a nozzle of the plasma arc torch during a pilot arc mode. Next, the arc can be transferred from the corresponding nozzle to a workpiece for piercing and cutting the workpiece. With the arc transferred, the plasma system (e.g., power supply) can begin a workpiece piercing sequence. For example, in some cases, the piercing sequence can include increasing plasma arc current to increase the energy being directed to the workpiece. Alternatively or additionally, the piercing sequence can include increasing the gas pressure, for example, to help remove molten material from the workpiece pierced hole.

During the piercing sequence, a characteristic associated with a pulse width modulated signal being provided to the torch to maintain plasma arc between the torch and the workpiece can be measured. As discussed above, electrical system parameters, such as the pulse width modulation duty cycle, or rate of change thereof, as well as changes in plasma arc voltage can suggest physical information during piercing. Specifically, fast increases or bursts in the characteristic associated with a pulse width modulated signal being provided to the torch can suggest that the plasma has pierced (e.g., broken through) the workpiece. Thus, during the piercing sequence, the characteristic can be compared to a predetermined value (e.g., the threshold value). And in response to determining that a measured characteristic meets or exceeds the predetermined value, relative movement can be initiated between the workpiece and the plasma arc torch to begin a cutting sequence to form a cut along the workpiece. For example, the relative movement between the workpiece and the plasma arc torch can be initiated by sending a signal from a power supply in communication with the plasma arc torch to a movement controller mechanically coupled to the plasma arc torch. As described above, in some embodiments, the initiated relative movement between the workpiece and the plasma arc torch is delayed by a predetermined time period. The delay can be useful to open a semi-conical pierced hole in the workpiece into a substantially cylindrical pierced hole using plasma expelled from the plasma arc torch.

Unless otherwise stated, various features and embodiments of these methods can be combined with one another or with the other aspects described herein.

Inert Gas Assisted Workpiece Piercing Methods

Figure 10:
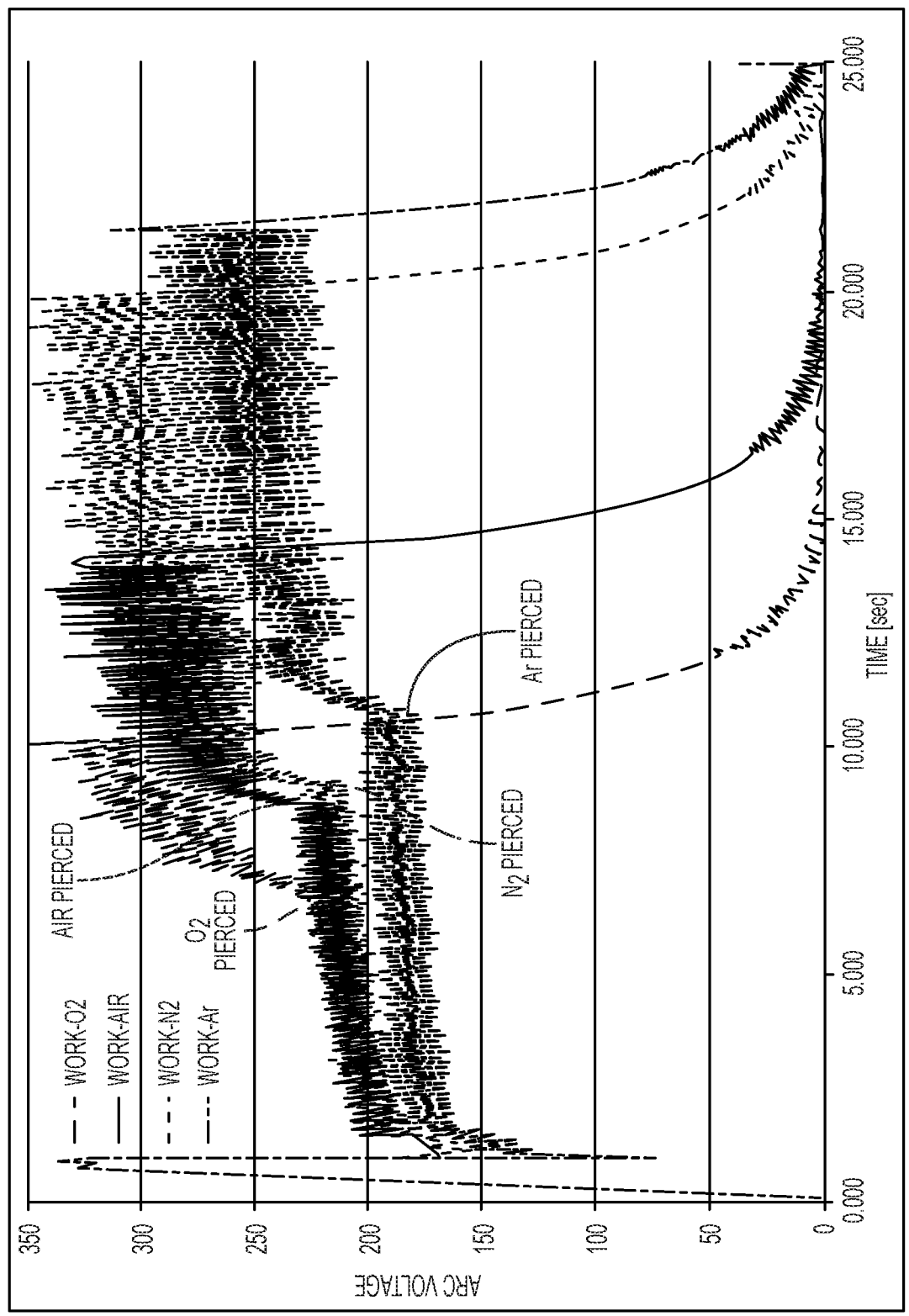
FIG. 10 is a schematic of example arc voltages during workpiece piercing, illustrating reduced piercing voltages when using various gases for the plasma and shield gases.

Alone or in combination with the various other aspects described above, other techniques can be implemented during piercing to increase the usable life of an electrode (e.g., the number of piercing sequences for which an electrode can be used). As discussed herein, these methods can be implemented in association with conventional piercing sequences (e.g., using predetermined piercing times discussed above) or with one or more of the more controlled pierce detections sequences herein (e.g., using voltage estimation or pulse width modulation). In some cases, the combination of methods has the advantage of reducing pierce times, since higher voltage pierces often have shorter pierce times, and could also help in the interaction with the CNC control. Specifically, performing a pierce sequence (e.g., after a plasma arc has been transferred to a workpiece and a pilot hole is being formed in the workpiece before moving the torch to form a cut) in the presence of a non-oxidative gas, such as an inert gas (e.g., an argon gas or a nitrogen gas), can help to create an environment in which the voltage needed to complete the pierce is reduced. As a result of the lower voltage for piercing, a plasma arc electrode can be used for a greater number of piercing operations. For example, the inert gas (e.g., argon or nitrogen gas) and lower voltages can permit the torch from being further away from the workpiece during piercing (e.g., have a higher standoff height), which can also help increase the usable life. In some cases, the greater standoff height can help reduce molten workpiece material spatter from adhering to the torch (e.g., consumables). These changes could be detrimental to the cutting performance and would only be used while piercing. Therefore, pierce detection by arc voltage estimation, PWM analysis, and/or processing, and/or change in the gas type and settings (shield or plasma) can be selectively used during piercing and switched to the optimum setting for cutting operation. In some embodiments certain parameters could be used during piercing and certain parameters could be used during cutting. Examples could be changing the arc current, plasma gas pressure, or shield pressure. For example, FIG. 10 depicts experiments in which the use of argon gas can result in lower plasma arc voltage during piercing.

Based on these observations and discoveries, various methods can be carried out for initiating a plasma arc, piercing a workpiece, and performing a cutting operation. For example, in some aspects, a method for increasing a usable number of pierce operations for an electrode of a plasma arc torch can first include initiating an arc between the electrode and a corresponding nozzle of the plasma arc torch during a pilot arc mode and transferring the arc from the corresponding nozzle to a workpiece for piercing and cutting the workpiece. Once attached to the workpiece, a current of the plasma arc can be increased. The piercing can also include delivering a gas mixture comprising an argon gas as a plasma gas or a shield gas to surround the arc. In some embodiments, the gas mixture can include the argon gas being delivered from a metering console located on or near the plasma arc torch as described above. The presence of the inert gas (e.g., argon, nitrogen, etc.) can reduce a maximum plasma arc voltage required to break through the workpiece during the piercing sequence. Additionally, in some cases, the presence of the inert gas can actually increase the time to penetrate and pierce the workpiece.

Then, in response to determining that the piercing sequence has completed, the plasma system can begin a cutting sequence and moving the plasma arc torch relative to the workpiece. Determining that the piercing sequence has completed can be accomplished in any of various ways including using predetermined time periods and cut charts, as well as the various pierce detection methods described above. In some embodiments, the beginning of a cutting sequence can include providing a motion signal to a CNC controller to initiate relative motion between the torch and the workpiece. In some embodiments, the beginning of a cutting sequence can include delivering a second gas mixture to surround the arc that is distinct from gas mixture delivered during the piercing sequence. That is, in some examples, a set of gases can be used during piercing and then changed for cutting. For example, the gas mixture delivered during the piercing sequence can include a plasma gas comprising argon and a shield gas comprising oxygen, and the beginning a cutting sequence can include delivering a second gas mixture to surround the arc comprising a plasma gas comprising nitrogen and a shield gas comprising argon.

Additionally or alternatively, in some aspects, methods of operating a plasma arc torch can include operating the plasma arc torch in an arc initiation mode by generating an arc between an electrode and a nozzle in the presence of a first set of shield and plasma gases. The first set of gases can include pilot arc mode gases. In some cases, the pilot arc mode gases can be similar or the same as subsequently used piercing gases.

The methods can next include operating the plasma arc torch in a transferred piercing mode by transferring the arc from the nozzle to a workpiece in the presence of a second set of shield and/or plasma gases. At least one of the shield or plasma gases of the second set at least partially includes an argon gas.

Based on determining that the arc has fully pierced the workpiece, the plasma arc torch can be operated in a transferred cutting mode. For example, the transferred cutting mode can include moving the torch relative to the workpiece in the presence of a third set of shield and plasma gases. In some embodiments, the operating the plasma arc torch in a transferred cutting mode can include providing a motion signal to a CNC controller to initiate the moving of the torch. In some embodiments, the third set of shield and plasma gases can be distinct from the second set. That is, a certain set of gases (e.g., having argon) can be used for piercing and then a different set of gases can be used for cutting.

Unless otherwise stated, various features and embodiments of these methods can be combined with one another or with the other aspects described herein.

While various aspects and embodiments have been described herein, it should be understood that they have been presented and described by way of example only, and do not limit the claims presented herewith to any particular configurations or structural components. Thus, the breadth and scope of a preferred embodiment should not be limited by any of the above-described exemplary structures or embodiments, but should be defined only in accordance with the following claims and their equivalents. Therefore, other embodiments fall within the scope of the following claims.

What is claimed:

1. A method for preserving a usable life of a plasma arc torch, the method comprising:
   delivering a gas to the torch via a valve during a cutting sequence;
   measuring a characteristic of an electrical signal being provided to the torch to generate a plasma arc between the torch and a workpiece to be processed during the cutting sequence;
   monitoring the characteristic during operation of the torch over a time period;
   comparing the monitored characteristic to a threshold value;
   determining that an inadvertent arc extinguishment is about to occur where the monitored characteristic meets or exceeds the threshold value; and
   responsive to determining that the inadvertent arc extinguishment is about to occur, initiating an arc extinguishing sequence to preserve the torch, wherein the arc extinguishing sequence comprises reducing a plenum gas pressure via a vent such that the arc extinguishing sequence is completed in less than 60 milliseconds.

2. The method of claim 1, wherein the gas comprises a plasma gas.

3. The method of claim 1, wherein the characteristic comprises a characteristic of a pulse width modulation control system.

4. The method of claim 3, wherein the characteristic comprises a duty cycle of the pulse width modulation control system.

5. The method of claim 3, wherein the characteristic comprises a rate of change of a duty cycle of the pulse width modulation control system.

6. The method of claim 1, wherein the arc extinguishing sequence comprises reducing the plenum gas pressure to less than 7 psi.

7. The method of claim 6, wherein the arc extinguishing sequence comprises reducing the plenum gas pressure to less than 3 psi.

8. The method of claim 1, wherein the arc extinguishing sequence is completed in less than 10 milliseconds.

9. The method of claim 1, wherein the arc extinguishing sequence further comprises reducing a plasma arc current.

10. A method for preserving a usable life of a plasma arc torch, the method comprising:

delivering a gas to the torch via a valve during a cutting sequence;
measuring a characteristic of an electrical signal being provided to the torch to generate a plasma arc between the torch and a workpiece to be processed during the cutting sequence;
monitoring the characteristic during operation of the torch over a time period;
comparing the characteristic to a threshold value;
determining that an inadvertent arc extinguishment is about to occur where the monitored characteristic meets or exceeds the threshold value; and responsive to determining that the inadvertent arc extinguishment is about to occur, initiating an arc extinguishing sequence to preserve the life of the electrode, wherein the arc extinguishing sequence comprises actuating one of the valve or vent located within two feet of the torch such that the arc extinguishing sequence is completed in less than 60 milliseconds.

* * * * *